US011831910B2

(12) United States Patent
Ko et al.

(10) Patent No.: US 11,831,910 B2
(45) Date of Patent: Nov. 28, 2023

(54) METHOD AND APPARATUS FOR ENCODING/DECODING VIDEO, AND RECORDING MEDIUM STORING BIT STREAM

(71) Applicant: ELECTRONICS AND TELECOMMUNICATIONS RESEARCH INSTITUTE, Daejeon (KR)

(72) Inventors: Hyun Suk Ko, Daejeon (KR); Ha Hyun Lee, Seoul (KR); Sung Chang Lim, Daejeon (KR); Jung Won Kang, Daejeon (KR); Jin Ho Lee, Daejeon (KR); Dong San Jun, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 66 days.

(21) Appl. No.: 16/640,129

(22) PCT Filed: Aug. 20, 2018

(86) PCT No.: PCT/KR2018/009504
§ 371 (c)(1),
(2) Date: Feb. 19, 2020

(87) PCT Pub. No.: WO2019/039806
PCT Pub. Date: Feb. 28, 2019

(65) Prior Publication Data
US 2020/0296417 A1 Sep. 17, 2020

(30) Foreign Application Priority Data
Aug. 21, 2017 (KR) .................. 10-2017-0105183

(51) Int. Cl.
*H04N 19/593* (2014.01)
*H04N 19/11* (2014.01)
*H04N 19/176* (2014.01)

(52) U.S. Cl.
CPC .......... *H04N 19/593* (2014.11); *H04N 19/11* (2014.11); *H04N 19/176* (2014.11)

(58) Field of Classification Search
CPC .... H04N 19/593; H04N 19/11; H04N 19/176; H04N 19/70; H04N 19/463; H04N 19/105

(Continued)

(56) References Cited

U.S. PATENT DOCUMENTS 9,591,327 B2    3/2017  Lee et al.
9,661,345 B2    5/2017  Lee et al.
(Continued)

FOREIGN PATENT DOCUMENTS

CN    103200401 A    7/2013
CN    103621079 A    3/2014
(Continued)

OTHER PUBLICATIONS

International Search Report dated Nov. 21, 2018 in counterpart International Patent Application No. PCT/KR2018/009504 (4 pages in English and 4 pages in Korean).

(Continued)

*Primary Examiner* — Matthew K Kwan
(74) *Attorney, Agent, or Firm* — NSIP Law

(57) ABSTRACT

The present invention relates to an image encoding/decoding method and apparatus. The image decoding method according to the present invention may comprise reconstructing an intra prediction mode of a current block, determining a reference sample for intra prediction of the current block, and generating a prediction block of the current block by (Continued)

performing the intra prediction on the current block on the basis of the intra prediction mode and the reference sample. The determining of the reference sample or the intra prediction may be performed on the basis of a shape of the current block.

15 Claims, 16 Drawing Sheets

(58) Field of Classification Search
USPC .................................................. 375/240.12
See application file for complete search history.

(56) References Cited

U.S. PATENT DOCUMENTS

| | | | |
|---|---|---|---|
| 2010/0027655 | A1 | 2/2010 | Matsuo et al. |
| 2013/0170546 | A1* | 7/2013 | Kim ..................... H04N 19/176 |
| | | | 375/240.12 |
| 2013/0300591 | A1* | 11/2013 | Marpe ................. H03M 7/4006 |
| | | | 341/67 |
| 2017/0347093 | A1* | 11/2017 | Yu .......................... H04N 19/42 |
| 2017/0353719 | A1* | 12/2017 | Liu ....................... H04N 19/176 |
| 2018/0160113 | A1* | 6/2018 | Jeong ................... H04N 19/119 |
| 2019/0141318 | A1* | 5/2019 | Li ......................... H04N 19/159 |
| 2019/0200011 | A1* | 6/2019 | Yoo ...................... H04N 19/176 |
| 2019/0238835 | A1* | 8/2019 | Lee ......................... H04N 19/70 |

FOREIGN PATENT DOCUMENTS

| | | |
|---|---|---|
| CN | 106105208 A | 11/2016 |
| KR | 10-2009-0110336 A | 10/2009 |
| KR | 10-2013-0027400 A | 3/2013 |
| KR | 10-2013-0137680 A | 12/2013 |
| KR | 10-1566290 B1 | 11/2015 |
| KR | 10-2015-0140848 A | 12/2015 |
| KR | 10-1600059 B1 | 3/2016 |
| WO | WO 2012/087034 A2 | 6/2012 |
| WO | WO 2012/148138 A2 | 11/2012 |
| WO | WO 2014/010943 A1 | 1/2014 |
| WO | WO 2016/182317 A1 | 11/2016 |
| WO | WO 2017/090993 A1 | 6/2017 |

OTHER PUBLICATIONS

Chien, Wei-Jung et al., Parsing Friendly Intra Mode Coding, "*Joint Collaborative Team on Video Coding (JCT-VC) of ITU-T SG16 WP3 and ISO/IEC JTC1/SC29/WG11.*" 6$^{th}$ Meeting: Torino, IT, Jul. 14-22, 2011 (5 pages in English).

Chang, Yao-Jen, et al. "Arbitrary reference tier for intra directional modes." JVET-C0043r1, Joint Video Exploration Team (JVET) of ITU-T SG16 WP3 and ISO/IET JTC 1, 2016, (5 pages in English).

Seregin, Vadim, et al. "Neighbor based intra most probable modes list derivation." JVET-C0055, Joint Video Exploration Team (JVET) of ITU-T SG16 WP3 and ISO/IET JTC 1, 2016, (4 pages in English).

* cited by examiner

METHOD AND APPARATUS FOR ENCODING/DECODING VIDEO, AND RECORDING MEDIUM STORING BIT STREAM

CROSS REFERENCE TO RELATED APPLICATIONS

This application is a U.S. National Stage Application of International Application No. PCT/KR2018/009504, filed on Aug. 20, 2018, which claims the benefit under 35 USC 119(a) and 365(b) of Korean Patent Application No. 10-2017-0105183, filed on Aug. 21, 2017, in the Korean Intellectual Property Office, the entire disclosure of which is incorporated herein by reference for all purposes.

TECHNICAL FIELD

The present invention relates to a method and apparatus for encoding/decoding an image. Particularly, the present invention relates to a method and apparatus for encoding/decoding an image using intra prediction and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide a method and apparatus for encoding and decoding an image to enhance compression efficiency and a recording medium storing a bitstream generated by an image encoding method/apparatus of the present invention.

Another object of the present invention is to provide a method and apparatus for encoding and decoding an image using intra prediction to enhance compression efficiency and a recording medium storing a bitstream generated by an image encoding method/apparatus of the present invention.

Another object of the present invention is to provide a method and apparatus for encoding and decoding an image for performing intra prediction efficiently considering a shape of a block and a recording medium storing a bitstream generated by an image encoding method/apparatus of the present invention.

Technical Solution

A method of decoding an image according to the present invention may comprise reconstructing an intra prediction mode of a current block, determining a reference sample for intra prediction of the current block, and generating a prediction block of the current block by performing the intra prediction on the current block on the basis of the intra prediction mode and the reference sample, wherein the determining of the reference sample or the intra prediction may be performed on the basis of a shape of the current block.

In the method of decoding an image according to the present invention, the shape of the current block may be determined on the basis of a horizontal or vertical size of the current block.

In the method of decoding an image according to the present invention, the determining of the reference sample may comprise determining whether a sample adjacent to the current block is a noise reference sample, wherein whether the sample is the noise reference sample may be determined using a statistical value of reference samples adjacent to the current block.

In the method of decoding an image according to the present invention, when the current block is a non-square block and the intra prediction mode is a DC mode, a DC value for a region within a predetermined offset distance from, as a base side, one side among horizontal and vertical sides of the current block is different from a DC value for a region outside the predetermined offset distance away therefrom.

In the method of decoding an image according to the present invention, the DC value for the region within the predetermined offset distance may be calculated by interpolation between a first DC value derived from reference samples adjacent to a left and a top of the current block and a second DC value derived from reference samples adjacent to the base side.

In the method of decoding an image according to the present invention, when the current block is a non-square block which is vertically long and the intra prediction mode is a vertical mode, a reference sample for a region within a predetermined offset distance from a top of the current block may be different from a reference sample for a region outside the predetermined offset distance away therefrom.

In the method of decoding an image according to the present invention, the region within the predetermined offset distance may be predicted using a top reference sample of the current block, the region outside the predetermined offset distance may be predicted using a first reference value, and the first reference value may be calculated on the basis of a difference value between the top reference sample and a top left reference sample of the current block and a left reference sample of the current block, which is positioned at the predetermined offset distance away from the top of the current block.

In the method of decoding an image according to the present invention, the region within the predetermined offset distance may be predicted using an interpolation value between a top reference sample of the current block and a first reference value, the region outside the predetermined offset distance may be predicted using an interpolation value between the first reference value and a second reference value, the first reference value may be calculated on the basis of a difference value between the top reference sample and a top left reference sample of the current block and a left reference sample of the current block, which is positioned at the predetermined offset distance from the top of the current block, and the second reference value may be calculated on the basis of the difference value and a bottom left reference sample of the current block.

In the method of decoding an image according to the present invention, when the current block is a non-square block and the intra prediction mode is a DC mode, filtering may be performed on a region within a predetermined offset distance from, as a base side, one side among horizontal and vertical sides of the prediction block of the current block.

In the method of decoding an image according to the present invention, the filtering may be performed using an interpolation value between reference samples adjacent to the base side and a DC value of the current block.

A method of encoding an image according to the present invention may comprise determining an intra prediction mode for intra prediction of a current block, determining a reference sample for the intra prediction, and generating a prediction block of the current block by performing the intra prediction on the current block on the basis of the intra prediction mode and the reference sample, wherein the determining of the reference sample or the intra prediction may be performed on the basis of a shape of the current block.

In the method of encoding an image according to the present invention, the shape of the current block may be determined on the basis of a horizontal or vertical size of the current block.

In the method of encoding an image according to the present invention, the determining of the reference sample may comprise determining whether a sample adjacent to the current block is a noise reference sample, wherein whether the sample is the noise reference sample may be determined using a statistical value of reference samples adjacent to the current block.

In the method of encoding an image according to the present invention, when the current block is a non-square block, and the intra prediction mode is a DC mode, a DC value for a region within a predetermined offset distance from, as a base side, one side of horizontal and vertical sides of the current block may be different from a DC value for a region outside the predetermined offset distance away therefrom.

In the method of encoding an image according to the present invention, the DC value for the region within the predetermined offset distance may be calculated by interpolation between a first DC value derived from reference samples adjacent to a left and a top of the current block and a second DC value derived from reference samples adjacent to the base side.

In the method of encoding an image according to the present invention, when the current block is a non-square block which is vertically long and the intra prediction mode is a vertical mode, a reference sample for a region within a predetermined offset distance from a top of the current block may be different from a reference sample for a region outside the predetermined offset distance away therefrom.

In the method of encoding an image according to the present invention, the region within the predetermined offset distance may be predicted using a top reference sample of the current block, the region outside the predetermined offset distance may be predicted using a first reference value, and the first reference value may be calculated on the basis of a difference value between the top reference sample and a top left reference sample of the current block and a left reference sample of the current block, which is positioned at the predetermined offset distance away from the top of the current block.

In the method of encoding an image according to the present invention, the region within the predetermined offset distance may be predicted using an interpolation value between a top reference sample of the current block and a first reference value, the region outside the predetermined offset distance may be predicted using an interpolation value between the first reference value and a second reference value, the first reference value may be calculated on the basis of a difference value between the top reference sample and a top left reference sample of the current block and a left reference sample of the current block, which is positioned at the predetermined offset distance from the top of the current block, and the second reference value may be calculated on the basis of the difference value and a bottom left reference sample of the current block.

In the method of encoding an image according to the present invention, when the current block is a non-square block and the intra prediction mode is a DC mode, filtering may be performed on a region within a predetermined offset distance from, as a base side, one side among horizontal and vertical sides of the prediction block of the current block.

A computer-readable recording medium according to the present invention may store a bitstream generated by a method of encoding an image according to the present invention.

Advantageous Effects

According to the present invention, an image encoding/decoding method and apparatus of improved compression efficiency and a recording medium storing a bitstream generated by an image encoding method/apparatus of the present invention may be provided.

And, according to the present invention, an image encoding/decoding method and apparatus using intra prediction of improved compression efficiency and a recording medium storing a bitstream generated by an image encoding method/apparatus of the present invention may be provided.

And, according to the present invention, an image encoding/decoding method and apparatus for performing intra prediction efficiently considering a shape of a block etc., and a recording medium storing a bitstream generated by an image encoding method/apparatus of the present invention may be provided.

MODE FOR INVENTION

Figure 1:
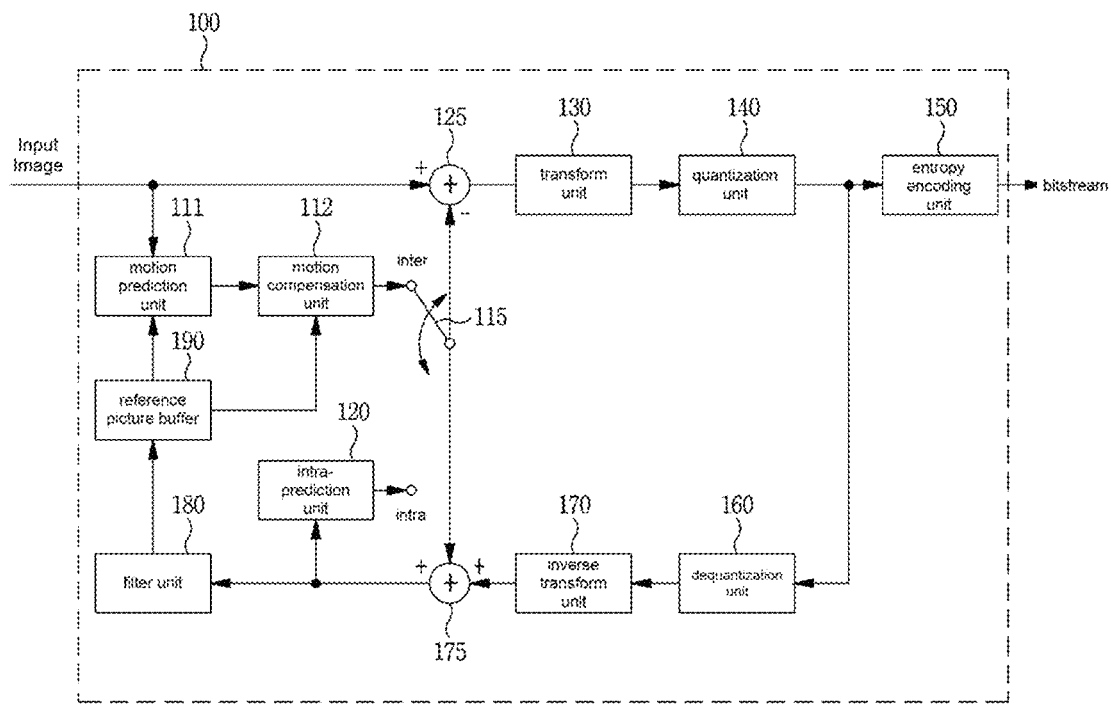
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method, a ternary-tree partitioning method, etc. to configure a lower unit such as coding unit, prediction unit, transform unit, etc. It may be used as a term for designating a sample block that becomes a process unit when encoding/decoding an image as an input image. Here, a quad-tree may mean a quarternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may mean a list including one or more reference pictures used for inter prediction or motion compensation. LC (List Combined), L0 (List 0), L1 (List 1), L2 (List 2), L3 (List 3) and the like are types of reference picture lists. One or more reference picture lists may be used for inter prediction.

Inter prediction Indicator: may mean an inter prediction direction (uni-directional prediction, bi-directional prediction, and the like) of a current block. Alternatively, the inter prediction indicator may mean the number of reference pictures used to generate a prediction block of a current block. Further alternatively, the inter prediction indicator may mean the number of prediction blocks used to perform inter prediction or motion compensation with respect to a current block.

Prediction list utilization flag: may represent whether a prediction block is generated using at least one reference image included in a specific reference picture list. An inter prediction indicator may be derived using a prediction list utilization flag, and reversely, a prediction list utilization flag may be derived using an inter prediction indicator. For example, when a prediction list utilization flag indicates a first value of "0", it represents a prediction block is not generated using a reference picture included in the corresponding reference picture list. When a prediction list utilization flag indicates a second value of "1", it represents a prediction block is generated using a reference picture included in the corresponding reference picture list.

Reference Picture Index: may mean an index indicating a specific reference picture in a reference picture list.

Reference Picture: may mean a picture to which a specific block refers for inter prediction or motion compensation. Alternatively, a reference picture may be a picture including a reference block referred to by a current block for inter prediction or motion compensation. Hereinafter, the term "reference picture" and "reference image" may be used as the same meaning and used interchangeably.

Motion Vector: is a two-dimensional vector used for inter prediction or motion compensation and may mean an offset between a reference picture and an encoding/decoding target picture. For example, (mvX, mvY) may represent a motion vector, mvX may represent a horizontal component, and mvY may represent a vertical component.

Search Range: may be a 2-dimensional region where search for a motion vector during inter prediction is performed. For example, a size of a search range may be M×N. M and N may be a positive integer, respectively.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list configured using one or more motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter prediction indicator, and at least any one among reference picture list information, a reference picture, a motion vector candidate, a motion vector candidate index, a merge candidate, and a merge index.

Merge Candidate List: may mean a list composed of merge candidates.

Merge Candidate: may mean a spatial merge candidate, a temporal merge candidate, a combined merge candidate, a combined bi-prediction merge candidate, a zero merge candidate, or the like. The merge candidate may have an inter prediction indicator, a reference picture index for each list, and motion information such as a motion vector.

Merge Index: may mean an indicator indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether to partition of a ternary-tree form, a partition direction of a ternary-tree form (horizontal direction or vertical direction), a partition form of a ternary-tree form (symmetric partition or asymmetric partition), whether to partition of a multi-type-tree form, a partition direction of a multi-type-tree form (horizontal direction or vertical direction), a partition form of a multi-type-tree form (symmetric partition or asymmetric partition), a partitioning tree of multi-type-tree form, a prediction mode(intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
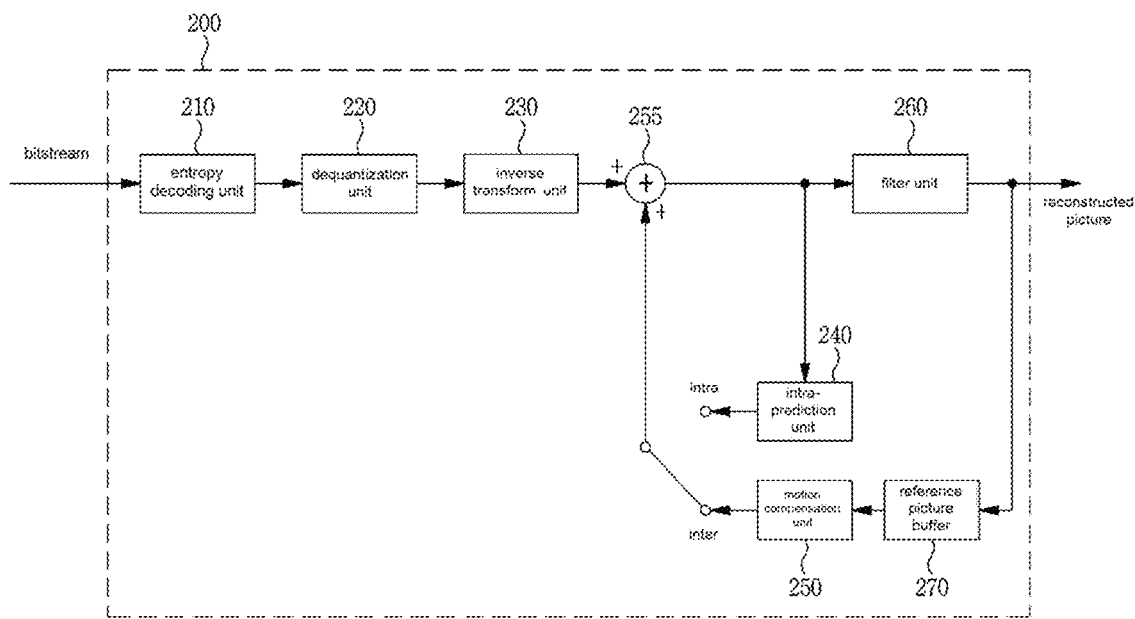
FIG. 2 is a block diagram showing configurations of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
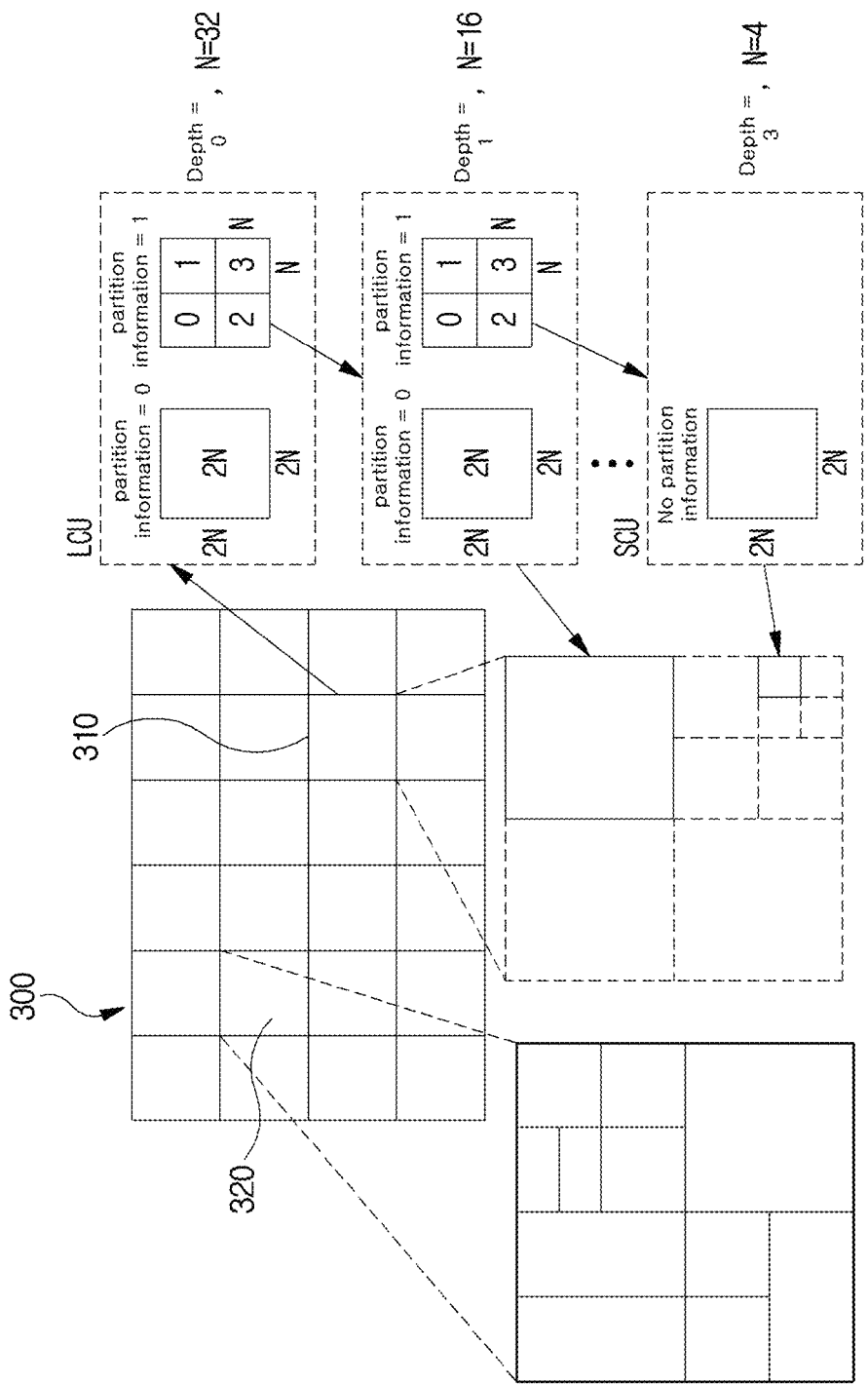
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within a CTU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of a CTU may be 0, and a depth of a smallest coding unit (SCU) may be a predefined maximum depth. Herein, the CTU may be a coding unit having a maximum coding unit size, and the SCU may be a coding unit having a minimum coding unit size as described above. Partitioning is started from the CTU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, a CTU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned(quad-tree partitioned) into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. For example, when a coding unit having a size of 8×32 is horizontally partitioned into two sub-coding units, each of the two sub-coding units may have a size of 8×16. When a single coding unit is partitioned into two coding units, it may be called that the coding unit is partitioned(binary-tree partitioned) in a binary-tree form.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-tree partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction information, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is partitioned by a multi-type tree partition structure, the coding unit may further include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is partitioned by a multi-type tree partition structure, the current coding unit may further include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quad-tree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bitstream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra slice and an inter slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra slice, the maximum size of a ternary tree may be 32×32. For example, for an inter slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-tree partitioned or ternary-tree partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-tree partitioned or ternary-tree partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-tree partitioned and/or ternary-tree partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-tree partitioned and/or ternary-tree partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
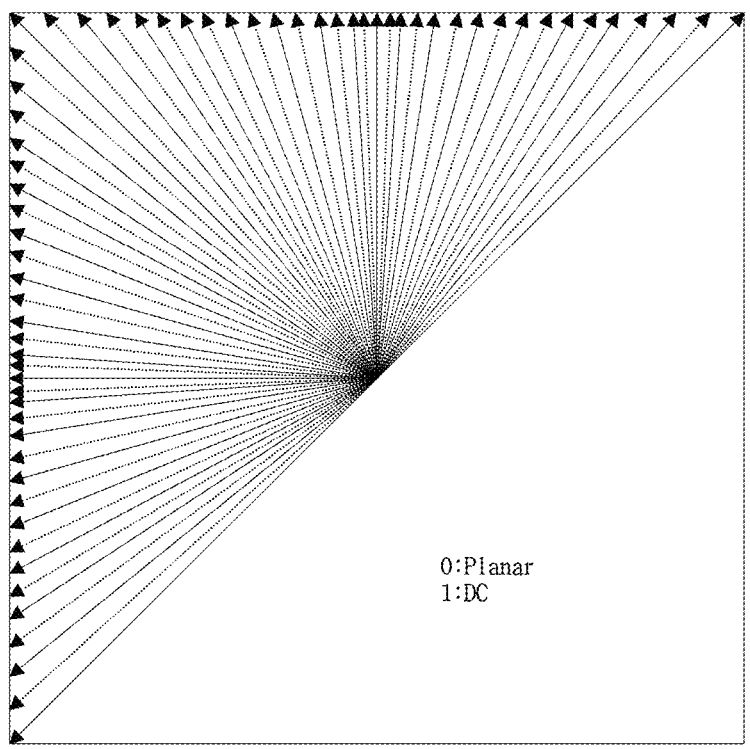
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M greater than 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
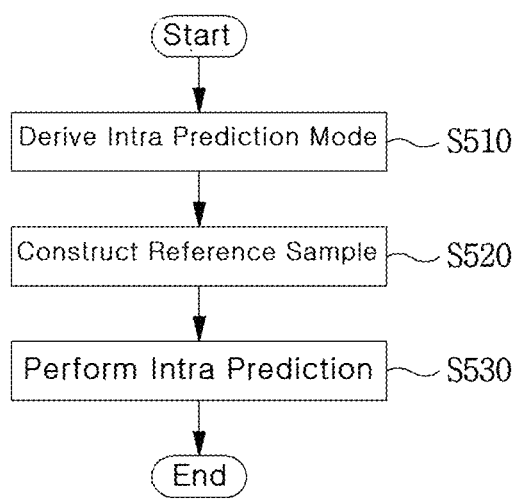
FIG. 5 is a view illustrating a method of performing intra prediction on a current block according to an embodiment of the present invention.

FIG. 5 is a view illustrating a method of performing intra prediction on a current block according to an embodiment of the present invention.

As shown in FIG. 5, intra prediction may include an intra-prediction mode inducement step S510, a reference sample configuration step S520 and/or an intra-prediction execution step S530.

At the intra-prediction mode inducement step S510, the intra-prediction mode of the current block may be induced using at least one of a method of using an intra-prediction mode of a neighbor block, a method of decoding the intra-prediction mode of the current block (e.g., entropy decoding) and/or a method of using an intra-prediction mode of a color component.

In the method of using the intra-prediction mode of the neighbor block, the intra-prediction mode of the current block may be induced by using at least one of the intra-prediction mode of the neighbor block, a combination of one or more intra-prediction modes of the neighbor block, and/or an intra-prediction mode induced by using MPM lists.

At the reference sample configuration step S520, a reference sample selection step and/or a reference sample filtering step may be performed such that a reference sample may be configured.

At the intra prediction execution step S530, at least one method of non-directionality prediction, directionality prediction, location-information-based prediction, prediction between color components and/or prediction based on a shape of a block is used to perform intra prediction of the current block. At the intra prediction execution step S530, filtering for a prediction sample may be executed.

Hereinafter, the intra-prediction mode inducement step S510 will be described in detail.

A neighbor block of the current block may be at least one of lower left, left, upper left, upper, and upper right neighbor blocks of the current block. Among the neighbor blocks, only neighbor blocks that can use the intra-prediction mode may be used.

Among the neighbor blocks of the current block, an intra-prediction mode of a neighbor block at a particular position may be induced as the intra-prediction mode of the current block.

Alternatively, two or more neighbor blocks are selected, a statistic value of intra-prediction modes of the selected neighbor blocks may be induced as the intra-prediction mode of the current block. The intra-prediction mode may be indicated by at least one of a mode number, a mode value, and a mode angle. In the description, the statistic value may be at least one of a minimum value, a maximum value, an average value, a weighted average value, the most frequent value, an interpolation value and a median value.

The neighbor block at the particular position and/or the selected neighbor blocks may be a block(s) at a predefined fixed position. Alternatively, the block(s) may be specified based on information signaled through a bitstream.

When using at least two intra-prediction modes, whether the intra-prediction mode has directionality or non-directionality may be considered. For example, among two or more intra-prediction modes, the intra-prediction mode of the current block may be induced using a directional intra-prediction mode. Alternatively, the intra-prediction mode of the current block may be induced using a non-directional intra-prediction mode.

When the weighted average value is used as the statistic value, a relatively high weight may be assigned to a particular intra-prediction mode. The particular intra-prediction mode may be at least one of, for example, a vertical mode, a horizontal mode, a diagonal mode, a non-directionality mode. Alternatively, information on the particular intra-prediction mode may be signaled through a bitstream. Respective weights of particular intra-prediction modes may be equal to or different from each other. Alternatively, the weight may be determined based on a size of a neighbor block. For example, a relatively high weight may be assigned to an intra-prediction mode of a relatively large neighbor block.

The intra-prediction mode of the current block may be induced using an MPM (Most Probable Mode).

When using the MPM, an MPM list may be configured using N intra-prediction modes induced using the intra-prediction mode of the neighbor block. N is a positive integer, and may have a value that differs depending on a size and/or a shape of the current block. Alternatively, information on N may be signaled through a bitstream.

Intra-prediction modes that may be included in the MPM list may be intra-prediction modes of lower left, left, upper left, upper and/or upper right neighbor blocks of the current block. Also, the non-directionality mode may be included in the MPM list. The intra-prediction modes may be included in the MPM list in a predetermined order. The predetermined order may be, for example, an order of a mode of a lower left block, a mode of an upper block, a Planar mode, a DC mode, a mode of a lower left block, a mode of an upper right block, and a mode of an upper left block. Alternatively, the predetermined order may be an order of a mode of a left block, a mode of an upper block, a Planar mode, a DC mode, a mode of a lower left block, a mode of an upper right block, and a mode of an upper left block.

The MPM list may be configured to not include a duplicate mode. When the number of intra-prediction modes included in the MPM list is less than N, an additional intra-prediction mode may be included in the MPM list. The additional intra-prediction mode may be a mode corresponding to +k, −k of the directional intra-prediction mode included in the MPM list. An integer equal to or greater than one may be designated by k. Alternatively, at least one of a horizontal mode, a vertical mode, and a diagonal mode (a 45-degree angle mode, a 135-degree angle mode, and a 225-degree angle mode) may be included in the MPM list. Alternatively, a statistic value of at least one intra-prediction mode of the neighbor block may be used to induce an intra-prediction mode to be included in the MPM list.

There may be several MPM lists, and several MPM lists may be configured in different methods. The intra-prediction mode included in each MPM list may not be duplicated.

Information (e.g., flag information) indicating whether the intra-prediction mode of the current block is included in the MPM list may be signaled through a bitstream. When there are N MPM lists, N pieces of flag information may exist. Determining whether the intra-prediction mode of the current block exits in the MPM list may be performed in order for N MPM lists. Alternatively, information indicating a MPM list including the intra-prediction mode of the current block, among N MPM lists, may be signaled.

When the intra-prediction mode of the current block is included in the MPM list, index information for specifying which mode, among modes included in the MPM list, may be signaled through a bitstream. Alternatively, a mode at a particular position (e.g., the first) of the MPM list may be induced as the intra-prediction mode of the current block.

In configuring the MPM list, one MPM list may be configured for a predetermined-size block. When the predetermined-size block is partitioned into several sub-blocks, each of the several sub-blocks may use the configured MPM list.

Alternatively, the intra-prediction mode of the current block may be induced using at least one of the intra-prediction mode of the current block induced using the MPM and the intra-prediction mode of the neighbor block.

For example, when the intra-prediction mode of the current block induced using the MPM is Pred_mpm, the Pred_mpm is changed into a predetermined mode by using at least one intra-prediction mode of the neighbor block such that the intra-prediction mode of the current block may be induced. For example, the Pred_mpm may be increased or decreased by N by being compared with the size of the intra-prediction mode of the neighbor block. Here, N may be a predetermined integer, such as, +1, +2, +3, 0, −1, −2, −3, etc.

Alternatively, when one of the Pred_mpm and a mode of the neighbor block is the non-directionality mode and the other one is the directionality mode, the non-directionality mode may be induced as the intra-prediction mode of the current block or the directionality mode may be induced as the intra-prediction mode of the current block.

If the intra prediction mode of the current block is derived using N MPM lists or the intra prediction mode of the current block is entropy-encoded/decoded, an indicator (MPM flag) indicating whether the intra prediction mode of the current block is included among the intra prediction modes of each of the N MPM lists may be entropy-encoded/decoded, for each of the N MPM lists.

In the presence of the same intra prediction mode as the intra prediction mode of the current block among the intra prediction modes included in a specific one of the N MPM lists, index information (an MPM index) indicating the position or number of the intra prediction mode in the specific MPM list may be entropy-encoded. In addition, the same intra prediction mode as the intra prediction mode of the current block among the intra prediction modes included in the specific MPM list may be identified by entropy-decoding the index information. The index information may be entropy-encoded to a fixed-length code or a variable-length code. In addition, the intra prediction mode of the current block may be derived, using the index information.

In the absence of the same intra prediction mode as the intra prediction mode of the current block among the intra prediction modes included in the N MPM lists, a remaining intra prediction mode of the current block may be entropy-encoded in the encoder. The remaining intra prediction mode may be used to identify the intra prediction mode of the current block that is not included in at least one of the MPM lists. Or, the remaining intra prediction mode may be used to identify the intra prediction mode of the current block that is included in none of the MPM lists.

According to the present invention, the intra prediction mode of the current block may be derived by encoding/decoding. Herein, the intra prediction mode of the current block may be entropy-encoded/decoded without using the intra prediction mode of a neighbor block.

The intra-prediction mode of the current block may be induced using an intra-prediction mode of another color component. For example, when the current block is a chroma block, an intra-prediction mode of at least one relevant-luma block corresponding to the chroma target block may be used to induce an intra-prediction mode for the chroma block. Here, the relevant-luma block may be determined based on at least one of the position, size, shape, or coding parameter of the chroma block. Alternatively, the relevant-luma block may be determined based on at least one of the size, shape, or coding parameter of the luma block.

The relevant-luma block may be determined using a luma block including a sample corresponding to the central position of the chroma block, or using at least two luma blocks respectively including samples corresponding to at least two positions of chroma blocks. The at least two positions may include an upper left sample position and a center sample position.

When there are several relevant-luma blocks, a relevant-luma block corresponding to a predetermined position of the chroma block may be selected. The predetermined position may be determined based on at least one among a size, a shape and a depth of the chroma block. Alternatively, a statistic value of intra prediction modes of a plurality of relevant-luma blocks may be used.

When there are several relevant-luma blocks, a statistic value of intra-prediction modes of at least two relevant-luma blocks may be induced as the intra-prediction mode of the chroma block. Alternatively, an intra-prediction mode of a relatively large relevant-luma block may be induced as the intra-prediction mode of the chroma block. Alternatively, when the size of the luma block corresponding to a predetermined position of the chroma block is equal to or greater than the size of the chroma block, the intra-prediction mode of the chroma block may be induced using the intra-prediction mode of the relevant-luma block.

When the current block is partitioned into sub-blocks, the intra-prediction mode of each of the partitioned sub-blocks may be induced using at least one method of inducing the intra-prediction mode of the current block.

Intra prediction may be performed in a unit of a sub-block by using an intra prediction mode derived for each of sub-blocks using at least one among an intra prediction mode of the current block and intra prediction modes of encoded/decoded blocks using intra prediction among reconstructed blocks adjacent to the current block. Here, a previously encoded/decoded sub-block by a sub-block unit may be used as a reference sample of intra prediction of following sub-block unit.

An encoder may generate a transform coefficient by performing at least one among primary transform, secondary transform and quantization for a residual block generated after performing intra prediction by the sub-block unit. The generated transform coefficient may be entropy-encoded. At this time, none of primary transform, secondary transform and quantization may be performed. At least one among primary transform, secondary transform and quantization may be performed for the entire current block. Alternatively, at least one among primary transform, secondary transform and quantization may be performed for each of sub-blocks.

A decoder may entropy-decode a transform coefficient. A reconstructed residual block may be generated by performing at least one among inverse quantization, primary inverse transform and secondary inverse transform for the entropy-decoded transform coefficient. At this time, none of inverse quantization, primary inverse transform and secondary inverse transform may be performed. At least one among inverse quantization, primary inverse transform and secondary inverse transform may be performed for the entire current block. Alternatively, at least one among inverse quantization, primary inverse transform and secondary inverse transform may be performed for each of sub-blocks.

When an intra-prediction mode identical to an intra-prediction mode of a current block is not preset in the derived MPM list, the intra-prediction mode of the current block may be encoded/decoded by using the method described below.

In order to encode/decode an intra-prediction mode of a current block, intra-prediction modes that are not included in an MPM list including K candidate modes may be sorted in at least one of descending and ascending orders. When a total number of intra-prediction modes usable by the current block is N, a number of the sorted intra-prediction modes may be N–K. Herein, N may be a positive integer, and K may be a positive integer equal to or smaller than N.

Intra prediction information may be entropy-encoded/decoded. The intra prediction information may be signaled in at least one of a VPS (video parameter set), an SPS (sequence parameter set), a PPS (picture parameter set), an APS (adaptation parameter set), a slice header, a tile header, a unit of a CTU, a unit of a block, a unit of a CU, a unit of a PU and a unit of a TU. For example, intra prediction information may comprise at least one among pieces of information below.

A flag indicating whether an MPM is matched: e.g.) prev_intra_luma_pred_flag

An index indicating a position in an MPM list: e.g.) mpm_idx intra luma prediction mode information: e.g.) rem_intra_luma_pred_mode intra chroma prediction mode information: e.g.) intra_chroma_pred_mode An indicator (MPM flag) indicating, for each of N MPM lists, whether the same intra prediction mode as the intra prediction mode of the current block is included among the intra prediction modes of the MPM list, when the intra prediction mode of the current block is derived or entropy-encoded/decoded using the N MPM lists: e.g.) MPM_FLAG_1, MPM_FLAG_2, . . . , MPM_FLAG_N Index information indicating, when the same intra prediction mode as the intra prediction mode of the current block is included among the intra prediction modes of a specific one of the N MPM lists, the position or sequence of the intra prediction mode in the MPM list: e.g.) MPM_IDX_1, MPM_IDX_2, . . . , MPM_IDX_N When an MPM (Most Probable Mode) flag is 1, an intra prediction mode of a luma component may be derived from candidate modes including intra prediction modes of adjacent units having been already encoded/decoded by using an MPM index mpm_idx.

When the MPM (Most Probable Mode) flag is 0, the intra prediction mode of the luma component may be encoded/decoded by using intra prediction mode information on luma component rem_intra_luma_pred_mode.

An intra prediction mode of a chroma component may be encoded/decoded by using intra prediction mode information on chroma component intra_chroma_pred_mode and/or a corresponding intra prediction mode of a chroma component block.

The intra prediction information may be entropy-encoded/decoded based on at least one of coding parameters.

At least one of the above-described pieces of intra prediction information may not be signaled based on at least one of the size and shape of the block.

For example, if the size of the current block is a predetermined size, at least one piece of intra prediction information about the current block may not be signaled, and at least one piece of information about intra prediction corresponding to the size of a previously encoded/decoded upper level block may be used. For example, if the current block is shaped into a rectangle, at least one piece of intra prediction information about the current block may not be signaled, and at least one piece of information about intra prediction corresponding to the size of a previously encoded/decoded upper level block may be used.

When at least one of the pieces of intra prediction information is entropy-encoded/decoded, at least one of the following binarization methods may be used.

Truncated Rice binarization method
K-th order Exp_Golomb binarization method
Limited K-th order Exp_Golomb binarization method
Fixed-length binarization method
Unary binarization method
Truncated Unary binarization method
Truncated binarization method Now, a detailed description will be given of the reference sample construction step S520.

In intra prediction of the current block or a sub-block having a smaller size and/or shape than the current block based on the derived intra prediction mode, a reference sample may be constructed for the prediction. The following description is given in the context of the current block, and the current block may mean a sub-block. The reference sample may be constructed, using one or more reconstructed samples or sample combinations neighboring to the current block. Additionally, filtering may be applied in constructing the reference sample. Herein, the reference sample may be constructed using each reconstructed sample on a plurality of reconstructed sample lines, as it is. Or, the reference sample may be constructed after filtering between samples on the same reconstructed sample line. Or, the reference sample may be constructed after filtering between samples on different reconstructed sample lines. The constructed reference sample may be denoted by ref[m, n], and a reconstructed neighbor sample or a sample obtained by filtering the reconstructed neighbor sample may be denoted by rec[m, n]. Herein, m or n may be a predetermined integer value. In the case where the current block is of size W(horizontal)×H(vertical), if a left uppermost sample position of the current block is (0, 0), a relative position of a left uppermost reference sample closest to the sample position may be set to (−1, −1).

Figure 6:
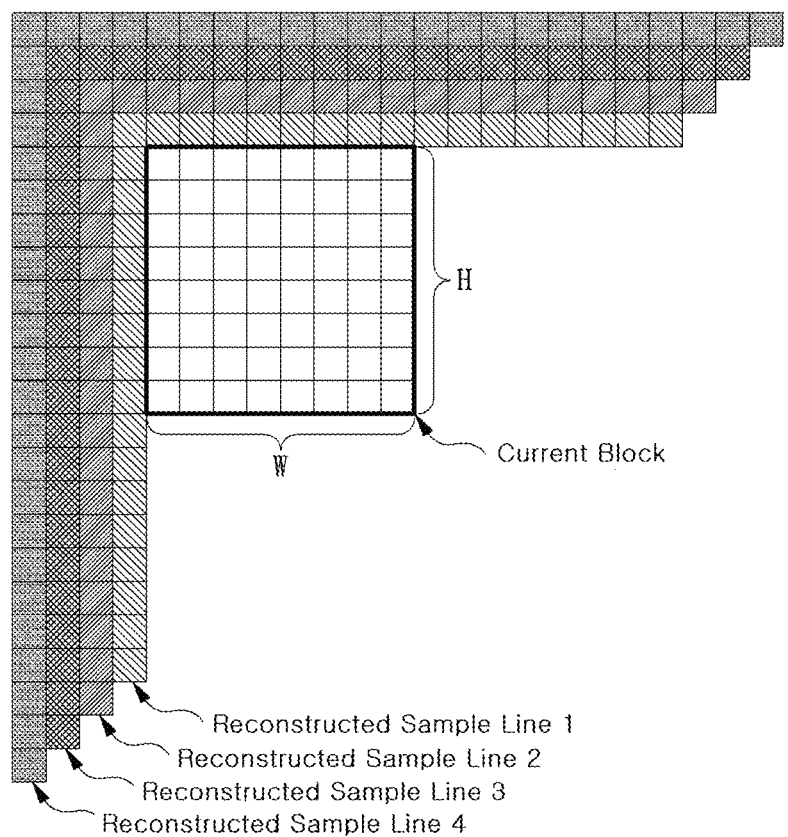
FIG. 6 is an exemplary view depicting neighbor reconstructed sample lines which may be used for intra prediction of a current block.

FIG. 6 is an exemplary view depicting neighbor reconstructed sample lines which may be used for intra prediction of a current block.

As illustrated in FIG. 6, a reference sample may be constructed using one or more reconstructed sample lines adjacent to the current block.

For example, one of a plurality of reconstructed sample lines illustrated in FIG. 6 may be selected, and a reference sample may be constructed using the selected reconstructed sample line. A predetermined one of the plurality of reconstructed sample lines may be fixedly selected as the selected reconstructed sample line. Or, a specific one of the plurality of reconstructed sample lines may be adaptively selected as the selected reconstructed sample line. In this case, an indicator for the selected reconstructed sample line may be signaled.

For example, a reference sample may be constructed using one or more of the plurality of reconstructed sample lines illustrated in FIG. 6 in combination. For example, a reference sample may be constructed as a weighted sum (or weighted mean) of one or more reconstructed samples. Weights used for the weighted sum may be assigned based on distances from the current block. Herein, a larger weight may be assigned for a shorter distance to the current block. For example, the following [Equation 1] may be used.

$$\text{ref}[-1,-1]=(\text{rec}[-2,-1]+2*\text{rec}[-1,-1]+\text{rec}[-1,-2]+2)>>2$$

$$\text{ref}[x,-1]=(\text{rec}[x,-2]+3*\text{rec}[x,-1]+2)>>2,$$
$$(x=0\sim W+H-1)$$

$$\text{ref}[-1,y]=(\text{rec}[-2,y]+3*\text{rec}[-1,y]+2)>>2,$$
$$(y=0\sim W+H-1) \qquad \text{[Equation 1]}$$

Or, a reference sample may be constructed using at least one of the mean value, maximum value, minimum value, median value, and most frequent value of a plurality of reconstructed samples based on at least one of distances from the current block or intra prediction modes.

Or, a reference sample may be constructed based on a change (variation) in the values of a plurality of contiguous reconstructed samples. For example, a reference sample may be constructed based on at least one of whether the difference between the values of two contiguous reconstructed samples is equal to or larger than a threshold, whether the values of the two contiguous reconstructed samples are changed continuously or non-continuously, and so on. For example, if the difference between rec[−1, −1] and rec[−2, −1] is equal to or larger than a threshold, ref[−1, −1] may be determined to be rec[−1, −1], or a value obtained by applying a weighted mean with a predetermined weight assigned to rec[−1, −1]. For example, if as a plurality of contiguous reconstructed samples are nearer to the current bloc, the values of the plurality of contiguous reconstructed samples are changed by n each time, a reference sample, ref[−1, −1] may be determined to be rec[−1, −1]−n.

At least one among the number and positions of reconstructed sample lines and a constructing method used for constructing the reference sample may be determined differently according to whether an upper or left boundary of the current block corresponds to a boundary of at least one among a picture, a slice, a tile and a Coding Tree Block (CTB).

For example, in constructing a reference sample using reconstructed sample lines 1 and 2, when the upper boundary of the current block corresponds to a CTB boundary, reconstructed sample line 1 may be used for the upper side and reconstructed sample lines 1 and 2 may be used for the left side.

For example, in constructing a reference sample using reconstructed sample lines 1 to 4, when the upper boundary of the current block corresponds to a CTB boundary, reconstructed sample lines 1 and 2 may be used for the upper side and reconstructed sample lines 1 to 4 may be used for the left side.

For example, in constructing a reference sample using reconstructed sample line 2, when the upper boundary of the current block corresponds to a CTB boundary, reconstructed sample line 1 may be used for the upper side and reconstructed sample line 2 may be used for the left side.

One or more reference sample lines may be constructed through the above process.

A reference sample constructing method of the upper side of the current block may be different from that of the left side.

Information indicating that a reference sample has been constructed using at least one method among the above methods may be encoded/decoded. For example, information indicating whether a plurality of reconstructed sample lines are used may be encoded/decoded.

If the current block is divided into a plurality of sub-blocks, and each sub-block has an independent intra prediction mode, a reference sample may be constructed for each sub-block.

Figure 7:
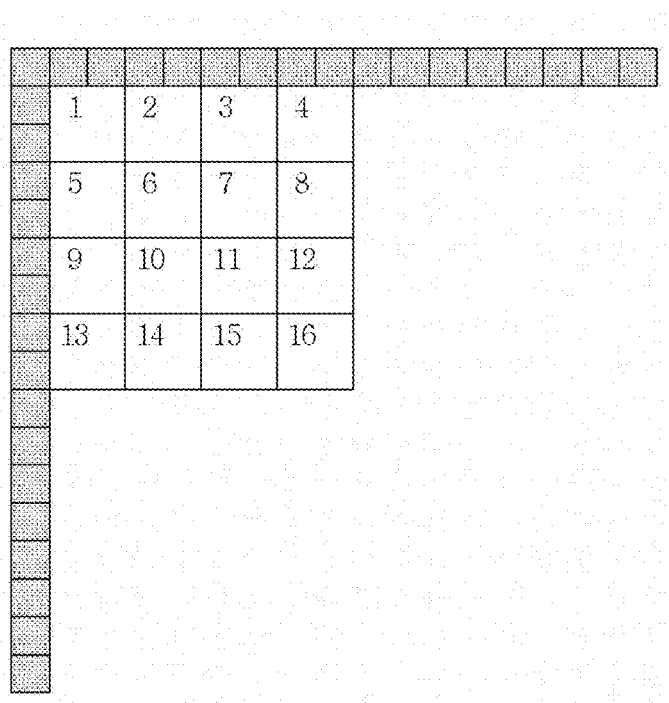
FIG. 7 is a view depicting an embodiment of constructing a reference sample for a sub-block included in a current block.

FIG. 7 is a view depicting an embodiment of constructing a reference sample for a sub-block included in a current block.

As illustrated in FIG. 7, if the current block is of size 16×16 and 16 4×4 sub-blocks have independent intra prediction modes, a reference sample for each sub-block may be constructed in at least one of the following methods according to a scanning scheme for predicting a sub-block.

For example, a reference sample may be constructed for each sub-block, using N reconstruction sample lines neighboring to the current block. In the example illustrated in FIG. 7, N is 1.

For example, in the case where a plurality of sub-blocks are predicted in a raster scan order of 1→2→3→ . . . 15→16, a reference sample for a Kth sub-block may be constructed, using a sample of at least one of already encoded/decoded left, top, top right, and bottom left sub-blocks.

For example, in the case where a plurality of sub-blocks are predicted in a Z scan order of 1→2→5→6→3→4→7→ . . . 12→15→16, a reference sample for a Kth sub-block may be constructed, using a sample of at least one of already encoded/decoded left, top, top right, and bottom left sub-blocks.

For example, in the case where a plurality of sub-blocks are predicted in a zig-zag scan order of 1→2→5→9→6→3→4→ . . . 12→15→16, a reference sample for a Kth sub-block may be constructed, using a sample of at least one of already encoded/decoded left, top, top right, and bottom left sub-blocks.

For example, in the case where a plurality of sub-blocks are predicted in a vertical scan order of 1→5→9→13→2→6→ . . . 8→12→16, a reference sample for a Kth sub-block may be constructed, using a sample of at least one of already encoded/decoded left, top, top right, and bottom left sub-blocks.

In the case where a plurality of sub-blocks are predicted in a scan order other than the above scan orders, a reference sample for a Kth sub-block may be constructed, using a sample of at least one of already encoded/decoded left, top, top right, and bottom left sub-blocks.

In selecting the reference sample, a decision as to the availability of a block including the reference sample and/or padding may be performed. For example, if the block including the reference sample is available, the reference sample may be used. Meanwhile, if the block including the reference sample is not available, the unavailable reference sample may be replaced with one or more available neighbor reference samples by padding.

If the reference sample exists outside at least one of a picture boundary, a tile boundary, a slice boundary, a CTB boundary, and a predetermined boundary, it may be determined that the reference sample is not available.

In the case where the current block is encoded by CIP (constrained intra prediction), if the block including the reference sample is encoded/decoded in an inter prediction mode, it may be determined that the reference sample is not available.

Figure 8:
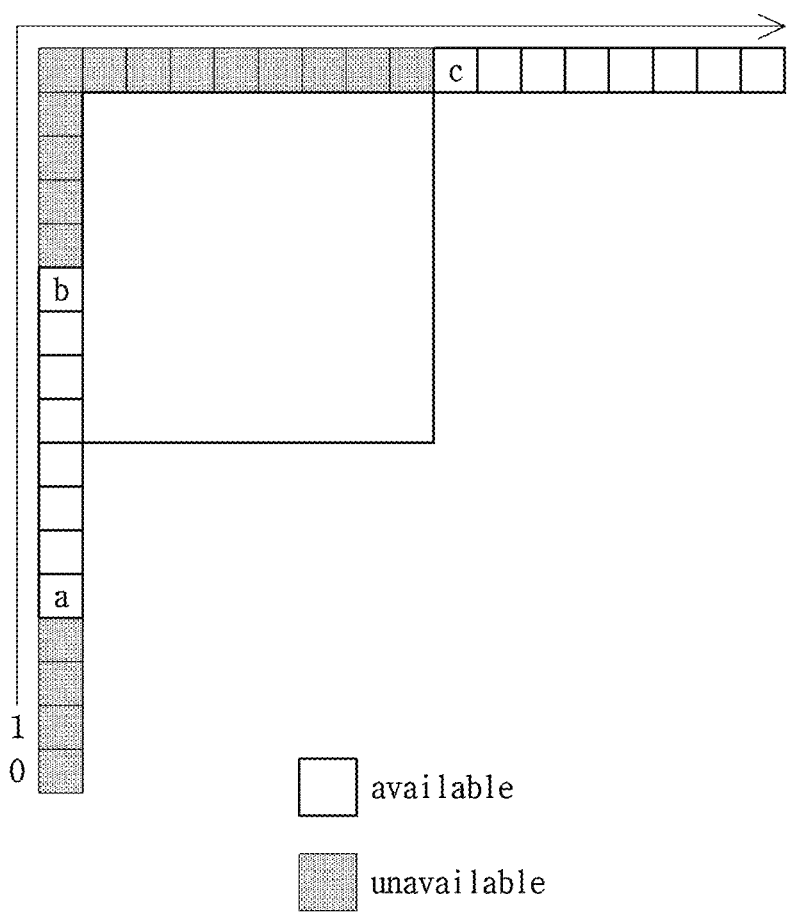
FIG. 8 is a view depicting a method for replacing an unavailable reconstructed sample, using an available reconstructed sample.

FIG. 8 is a view depicting a method for replacing an unavailable reconstructed sample, using an available reconstructed sample.

If it is determined that the neighbor reconstructed sample is unavailable, the unavailable sample may be replaced, using a neighbor available reconstructed sample. For example, as illustrated in FIG. 8, in the presence of available samples and unavailable samples, an unavailable sample may be replaced, using one or more available samples.

The sample value of an unavailable sample may be replaced with the sample value of an available sample in a predetermined order. An available sample adjacent to an unavailable sample may be used to replace the unavailable sample. In the absence of an adjacent available sample, the first appearing available sample or the closest available sample may be used. A replacement order of unavailable samples may be a left lowermost to right uppermost order. Or the replacement order of unavailable samples may be a right uppermost to left lowermost order. Or the replacement order of unavailable samples may be a left uppermost to right uppermost and/or left lowermost order. Or the replacement order of unavailable samples may be a right uppermost and/or left lowermost to left uppermost order.

As illustrated in FIG. 8, unavailable samples may be replaced in an order from a left lowermost sample position 0 to a right uppermost sample. In this case, the values of the first four unavailable samples may be replaced with the value of the first appearing or closest available sample a. The values of the next 13 unavailable samples may be replaced with the value of the last available sample b.

Or, an unavailable sample may be replaced, using a combination of available samples. For example, the unavailable sample may be replaced using the mean value of available samples adjacent to both ends of the unavailable sample. For example, in FIG. 8, the first four unavailable samples may be filled with the value of the available sample a, and the next 13 unavailable samples may be filled with the mean value of the available sample b and an available sample c. Or, the 13 unavailable samples may be filled with any value between the values of the available samples b and c. In this case, the unavailable samples may be replaced with difference values. For example, as an unavailable sample is nearer to the available sample a, the value of the unavailable sample may be replaced with a value close to the value of the available sample a. Similarly, as an unavailable sample is nearer to the available sample b, the value of the unavailable sample may be replaced with a value close to the value of the available sample b. That is, the value of an unavailable sample may be determined based on the distance from the unavailable sample to the available sample a and/or b.

To replace an unavailable sample, one or more of a plurality of methods including the above methods may be selectively applied. A method for replacing an unavailable sample may be signaled by information included in a bitstream, or a method predetermined by an encoder and a decoder may be used. Or the method for replacing an unavailable sample may be derived by a predetermined scheme. For example, a method for replacing an unavailable sample may be selected based on the difference between the values of the available samples a and b and/or the number of unavailable samples. For example, a method for replacing an unavailable sample may be selected based on a comparison between the difference between the values of two available samples and a threshold and/or a comparison between the number of unavailable samples and a threshold. For example, if the difference between the values of the two available samples is larger than the threshold and/or if the number of unavailable samples is larger than the threshold, the values of unavailable samples may be replaced with different values.

For the constructed one or more reference samples, it may be determined whether to apply filtering according to at least one of the intra prediction mode, size, and shape of the current block. If the filtering is applied, a different filter type may be used according to at least one of the intra prediction mode, size, and shape of the current block.

For example, for each of the plurality of reference sample lines, whether filtering is applied and/or a filter type may be determined differently. For example, filtering may be applied to a first neighbor line, whereas filtering may not be applied to a second neighbor line. For example, both a filtered value and a non-filtered value may be used for the reference sample. For example, among 3-tap filter, 5-tap filter and 7-tap filter, at least one may be selected and applied according to at least intra prediction mode, size and shape of a block.

Hereinbelow, the step of performing intra prediction (S530) will be described in detail.

Intra prediction may be performed for the current block or a sub-block based on the derived intra prediction mode and reference sample. In the following description, the current block may mean a sub-block.

For example, non-directional intra prediction may be performed. The non-directional intra prediction mode may be at least one of the DC mode and the Planar mode.

Intra prediction in the DC mode may be performed using a statistic value of one or more of the constructed reference samples. Filtering may be applied to one or more prediction samples at the boundary of the current block. The DC-mode intra prediction may be performed adaptively according to at least one of the size and shape of the current block.

Figure 9A:
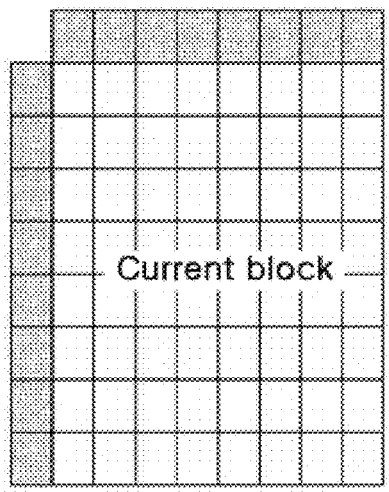
FIGS. 9A-9B are exemplary views illustrating intra prediction according to shapes of a current block.
Figure 9B:
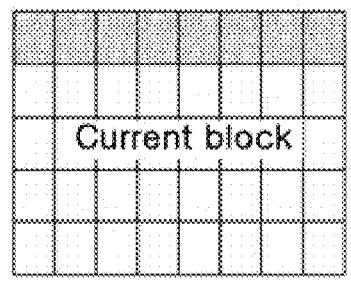

FIGS. 9A-9B show exemplary views illustrating intra prediction according to shapes of a current block.

For example, as illustrated in FIG. 9A, if the current block is shaped into a square, the current block may be predicted using the mean value of reference samples above and to the left of the current block.

For example, as illustrated in FIG. 9B, if the current block is shaped into a non-square, the current block may be predicted using the mean value of reference samples neighboring to the longer between the width and length of the current block.

In case width is greater than height (W>H), following equation 2 may be used. In equation 2, "W" means width, "p" means a reference sample adjacent, as much as width, to the upper side and "w" means $\log_2(W)$.

$$DC = \left(\left(\sum_{i=0}^{W-1} p_i\right) + (W >> 1)\right) >> w \quad \text{[Equation 2]}$$

In case height is greater than width (H>H), following equation 3 may be used. In equation 3, "H" means height, "p" means a reference sample adjacent, as much as height, to the left side having height and "h" means $\log_2(H)$.

$$DC = \left(\left(\sum_{i=0}^{H-1} p_i\right) + (H >> 1)\right) >> h \quad \text{[Equation 3]}$$

For example, if the size of the current block falls within a predetermined range, predetermined samples are selected from among the top or left reference samples of the current block, and prediction may be performed using the mean value of the selected samples.

Figure 10:
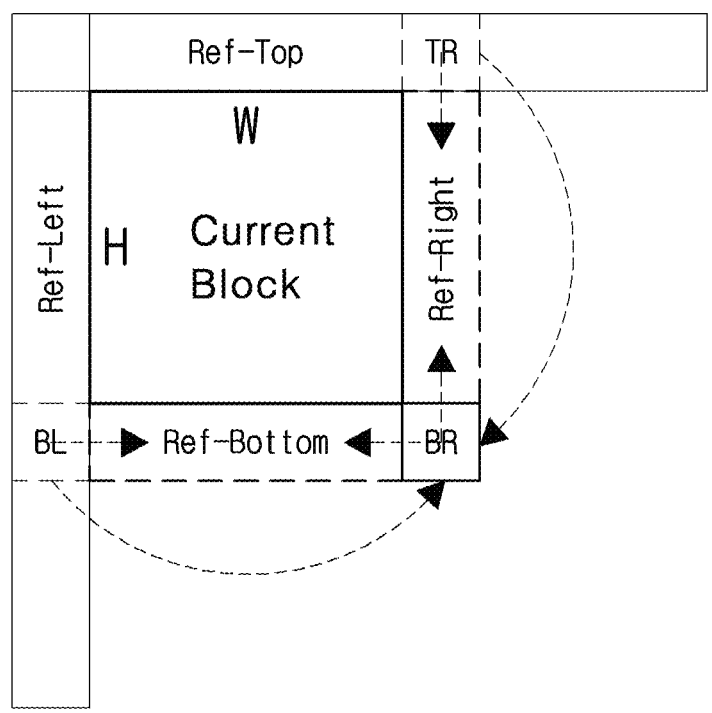
FIG. 10 is a diagram illustrating reference samples available for intra prediction according to the present invention.

FIG. 10 is a diagram illustrating reference samples available for intra prediction according to the present invention.

According to the present invention, in a DC mode, a predetermined sample(s) may be selected from top reference samples Ref-Top, left reference samples Ref-Left, bottom reference samples Ref-Bottom, and/or right reference samples Ref-Right of the current block. Prediction in the DC mode may be performed using an average value of the selected sample(s).

Hereinafter, the average value used for prediction in the DC mode is referred to as a DC value.

The bottom right reference sample BR, the right reference samples Ref-Right, and/or bottom reference samples Ref-Bottom of the current block may be generated by a method described below.

For example, the right reference samples Ref-Right may be generated by copying a value of a top right reference sample TR of the current block.

For example, the bottom reference samples Ref-Bottom may be generated by copying a value of a bottom left reference sample BL of the current block.

For example, the bottom right reference sample BR may be generated using a statistical value of the TR and the BL. When the horizontal length of the current block is W and the vertical length is H, the BR is derived as a weighted sum of the TR and the BL. For example, Equation 4 below may be used. In Equation 4, weights applied to the TR and the BL are W and H, respectively, but not limited thereto, and weights proportional to W and H may be applied.

$$BR = \frac{WsTR + HsBL}{W + H} \quad \text{[Equation 4]}$$

As another example, the right reference samples Ref-Right may be generated using a statistical value of the TR and the BR. Alternatively, each of the right reference samples Ref-Right may be an interpolation value using the TR and the BR. Hereinafter, interpolation mentioned in the present invention may be at least one among 1D-nearest neighbor interpolation, 2D-nearest neighbor interpolation, linear interpolation, bi-linear interpolation, cubic interpolation, bi-cubic interpolation, bi-lateral interpolation, particular linear interpolation, and non-linear interpolation. In performing interpolation, the y-coordinate of an interpolation target sample among the right reference samples Ref-Right may be used.

Also, the bottom reference samples Ref-Bottom may be generated using a statistical value of the BL and the BR. Alternatively, each of the bottom reference samples Ref-Bottom may be an interpolation value using the BL and the BR. In performing interpolation, the x-coordinate of an interpolation target sample among the bottom reference samples Ref-Bottom may be used.

When performing intra prediction in the DC mode using the top, left, bottom, and/or right reference samples, a DC value is calculated by assigning different weights to the reference sample (s) in a predetermined range. Here, the top, left, bottom, and/or right reference samples may be divided into N (N is an integer equal to or greater than one) groups, and different weights w1, w2, . . . , and wN may be assigned to the groups. The sum of the weights w1, w2, . . . , and wN may be one.

As an example, the same weight may be assigned to the top, left, bottom, and/or right reference samples.

As another example, the top, left, bottom, and/or right reference samples may be divided into two groups, and weights w1 and w2 may be assigned to the two groups. Here, among sub groups for the four reference samples of the top, left, bottom, and right, when the number of sub group(s) included in the first group is L and the number of sub group(s) included in the second group is M, L and M are positive integers and "L+M=4" is possible. Also, "w1+w2=1" is possible.

As still another example, the top, left, bottom, and/or right reference samples may be divided into three groups, and weights w1, w2, and w3 may be assigned to the three groups, respectively. Here, among sub groups for the four reference samples of the top, left, bottom, and right, when the number of sub group(s) included in the first group is L and the number of sub group(s) included in the second group is M and the number of sub group(s) included in the third group is N, L, M, and N are positive integers and "L+M+N=4" is possible. Furthermore, "w1+w2+w3=1" is possible.

As still another example, weights w1, w2, w3, and w4 may be assigned to the top, left, bottom, and/or right reference samples. Here, "w1+w2+w3+w4=1" is possible.

When the current block is W×H, a predetermined range of reference samples used to calculate the DC value is changed depending on the size and/or shape of the block. For example, when W, H, W*H, and/or W+H is equal to or less than a first size, the reference sample(s) of the first group is used. Alternatively, when W, H, W*H, and/or W+H is equal to or greater than a second size, the reference sample(s) of the second group is used. The reference sample(s) of the first group and/or the reference sample(s) of the second group may include one or more reference sample(s) selected from the left, top, bottom, and/or right reference samples.

As a modified example, when W and/or H is equal to or less than the first size, the DC value is calculated using the left and top reference samples. Alternatively, when W and/or H is equal to or greater than the second size, the DC value is calculated using the left and top reference samples. Alternatively, when W*H or W+H is equal to or greater than the second size, the DC value is calculated using the left and top reference samples. Alternatively, when W*H or W+H is equal to or less than the first size, the DC value is calculated using the left and top reference samples. Alternatively, when W and/or H is equal to or less than the first size, the DC value is calculated using the left, top, bottom, and right reference samples. Alternatively, when W and/or H is equal to or greater than the second size, the DC value is calculated using the left, top, bottom, and right reference samples. Alternatively, when W*H or W+H is equal to or greater than the second size, the DC value is calculated using the left, top, bottom, and right reference samples. Alternatively, when W*H or W+H is equal to or less than the first size, the DC value is calculated using the left, top, bottom, and right reference samples. The first and/or second size may be predetermined by the encoder and the decoder or may be signaled through a bitstream.

As another modified example, on the basis of comparison of W and H, different reference samples in the predetermined range may be selected and used. For example, in the case of W=H, among the left, top, bottom, and right reference samples, one or more reference sample(s) are used to calculate the DC value. In this case, the weights applied to the left, top, bottom, and/or right reference sample(s) may be the same.

For example, in the case of W>H, among the left, top, bottom, and right reference samples, one or more reference sample(s) are used to calculate the DC value. In this case, the left or right reference sample(s) may not be used. Alternatively, the weights applied to the top and bottom reference samples may be greater than weights applied to the left and right reference samples.

For example, in the case of W<H, among the left, top, bottom, and right reference samples, one or more reference sample(s) are used to calculate the DC value. In this case, the top or bottom reference sample(s) may be not used. Alternatively, the weight applied to the top and bottom reference sample(s) may be smaller than the weights applied to the left and right reference sample(s).

Among the configured reference samples, when the DC value of the DC mode is obtained using statistical values of one or more reference sample(s), the reference sample with a noise value is excluded in calculating the statistical value.

Figure 11:
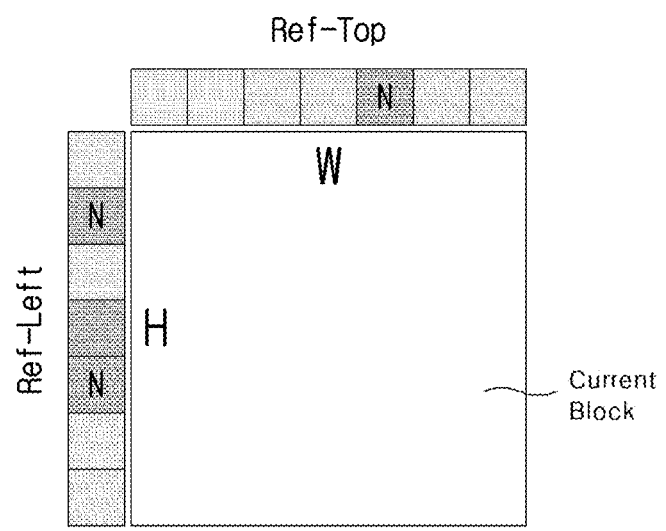
FIG. 11 is a diagram illustrating an example of calculating the DC value by using the top and left reference samples.

FIG. 11 is a diagram illustrating an example of calculating the DC value by using the top and left reference samples.

In FIG. 11, the reference sample designated by N denotes a sample determined as noise according to a predetermined criteria. In FIG. 11, the DC value may be calculated using statistical values of reference samples except for three noise reference samples designated by N.

As a predetermined criteria for determining whether the reference sample is a noise reference sample, as shown in the example in FIG. 11, when the DC value is calculated using the left and top reference samples, used is at least one among an average value, a variance value, and a standard deviation value of all reference samples at the left and top.

For example, according to a scanning order of the reference sample, an average value, a variance value, or a standard deviation value may be obtained with respect to all samples at the left and top. The product of the obtained average value, variance value, or standard deviation value and predetermined weight may be used as a threshold value for determining the noise reference sample. For example, a reference sample of which a value is greater than the threshold value may be determined as the noise reference sample and may be excluded in calculating the DC value. Instead of the value of the sample determined as the noise reference sample, the average value may be used in calculating the DC value.

For example, the noise sample removal process may be, in the example shown in FIG. 11, performed independently on the left reference samples and the top reference samples. For example, one or more among the average value, the variance value, and the standard deviation value of the left reference samples are obtained, and then the noise sample removal process may be performed on the left reference samples. Similarly, the noise sample removal process may be performed on the top reference pixels.

The noise sample removal process may be performed on the right reference samples and/or bottom reference samples. Alternatively, by using the left reference sample, top reference sample, BL and/or TR on which the noise sample removal process has been completed, the right reference samples and/or bottom reference samples may be generated.

The noise removal process may be performed on multiple reference sample lines.

In the DC mode, one or more DC values may be used in performing prediction. For example, the current block with the horizontal length of W and the vertical length of H is partitioned into multiple sub blocks, and then the DC value of each sub block is calculated to perform prediction.

Figure 12:
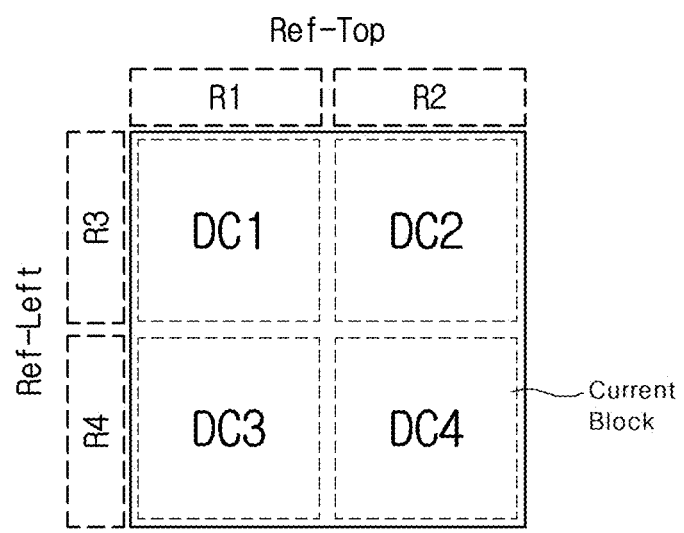
FIG. 12 is a diagram illustrating an example of performing DC prediction by partitioning the current block into multiple sub blocks.

FIG. 12 is a diagram illustrating an example of performing DC prediction by partitioning the current block into multiple sub blocks.

Figure 13:
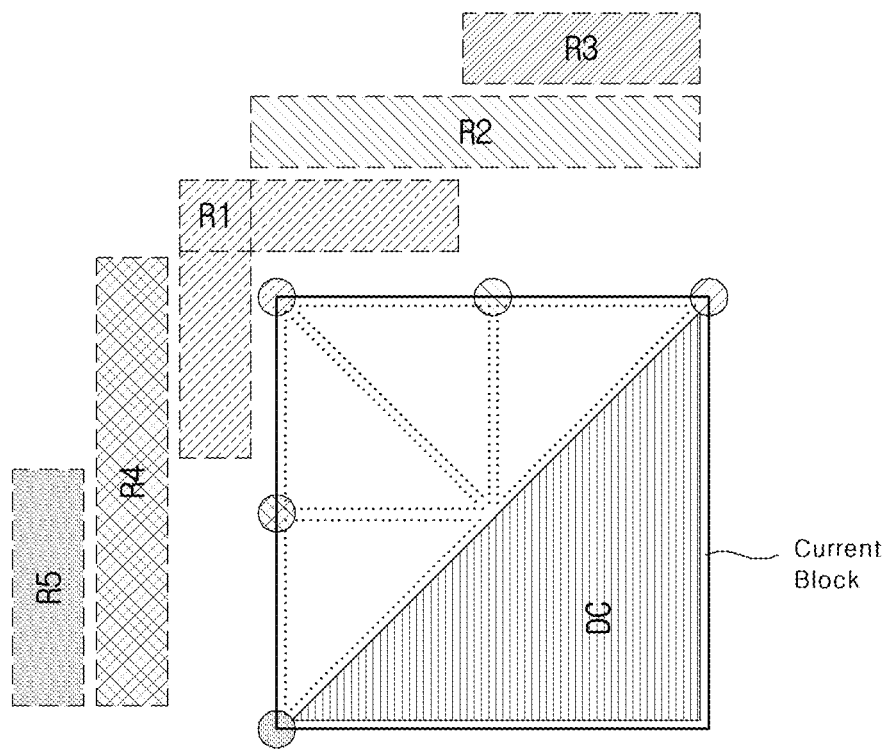
FIG. 13 is a diagram illustrating another example of performing DC prediction by partitioning the current block into multiple sub blocks.

FIG. 13 is a diagram illustrating another example of performing DC prediction by partitioning the current block into multiple sub blocks.

In the examples shown in FIGS. 12 and 13, by using the top and left reference samples of the current block, the DC value may be calculated according to a method described later.

In the case of FIG. 12, the current block may be partitioned into four sub blocks with the horizontal length of W/2 and the vertical length of H/2. Also, the DC value of each sub block may be determined by one or more of the following methods.

A DC1 value of the top left sub block may be obtained using a statistical value of R1 and R3 reference samples. A DC2 value of the top right sub block may be obtained using a statistical value of R2 and R3 reference samples or a statistical value of R2 reference samples and the DC1 value. A DC3 value of the bottom left sub block may be obtained using a statistical value of R1 and R4 reference samples or a statistical value of R4 reference samples and the DC1 value. For example, a DC4 value of the bottom right sub block may be obtained using a statistical value of R2 and R4 reference samples or a statistical value of the DC2 value and the DC3 value. The shape of the block to which the example is applied may be a non-square shape. For example, when the current block is in the shape of a non-square which is long in the horizontal direction, the current block is partitioned into two sub blocks with the horizontal length of W/2 and the vertical length of H. Referring to FIG. 12, the DC1 value of the sub block may be obtained using a statistical value of the R1 and R3 reference samples. The DC2 value of the sub block may be obtained using a statistical value of the R2 and R3 reference samples or a statistical value of the R2 reference samples and the DC1 value. For example, when the current block is in the shape of a non-square which is long in the vertical direction, the current block is partitioned into two sub blocks with the horizontal length of W and the vertical length of H/2. Referring to FIG. 12, the DC1 value of the sub block may be obtained using a statistical value of the R1 and R3 reference samples. The DC3 value of the sub block may be obtained using a statistical value of the R1 and R4 reference samples or a statistical value of the R4 reference samples and the DC1 value.

In the example described with reference to FIG. 12, the statistical value may be a weighted sum. Here, the weight may be determined on the basis of the distance between the current sub block and the reference sample. For example, large weight may be allocated to the near reference sample. Also, when calculating the weighted sum of the DC value of the adjacent sub block and the reference sample of the current sub block, relatively small weight is allocated to the DC value of the adjacent sub block.

In the case of FIG. 13, the left and top reference samples of the current block may be used in calculating the DC value of the entire current block. Also, by using an interpolation value between a sub_DC value of some reference sample sections at the left and top and the DC value of the entire current block, the DC value with respect to regions close to the reference sample in the current block is calculated.

In the example shown in FIG. 13, for example, the DC value DC5 of the bottom left reference sample R5 may be calculated and set as the sub_DC value at the bottom left position of the current block. For example, the DC value DC4 of the left reference sample R4 may be calculated and set as the sub_DC value at the left middle position of the current block. For example, the DC value DC1 of the top left reference sample R1 may be calculated and set as the sub_DC value at the top left position of the current block. For example, the DC value DC2 of the top reference sample R2 may be calculated and set as the sub_DC value at the top middle position of the current block. For example, the DC value DC3 of the top right reference sample R3 may be calculated and set as the sub_DC value at the top right position of the current block.

After calculating the sub_DC value, the interpolation value of the DC value and sub_DC values (DC1 to DC5 values) may be used to calculate the DC value of top left triangles (dotted triangles within the current block) of the current block shown in FIG. 13.

For example, the region in which the final DC value is calculated using the interpolation value of the DC value and the DC1~DC5 values may be a partial region of the current block or the entire current block.

As described above with reference to FIG. 6, when multiple reconstruction sample lines are used, all the reference samples R1 to R5 shown in FIGS. 12 and 13 are a part of the same reconstruction sample line. Alternatively, at least some of the reference samples R1 to R5 may be a part of a reconstruction sample line different from the remaining reference samples. Alternatively, one or several of the reference samples R1 to R5 may consist of reference samples with N columns or M rows. Here, N or M may be a positive integer that is equal to or smaller than the number of available reconstruction sample lines.

When the horizontal length of the current block is W and the vertical length is H, prediction in the DC mode is performed differently depending on the shape of the block. Specifically, from reference samples of which the number is W+H, the DC value of the current block may be calculated. Also, on the basis of the result of comparison of W and H, the DC1 value may be calculated from W top reference samples. Also, the DC2 value may be calculated from H left reference samples. With respect to some regions of the current block, a value obtained by interpolating the calculated DC1 value and/or DC2 value and the DC value may be assigned as a prediction value. With respect to the regions except for some regions to which the interpolation value is assigned, the DC value of the current block may be assigned as a prediction value. Some regions to which the interpolation value is assigned may be determined depending on the length of W and/or H.

Figure 14C:
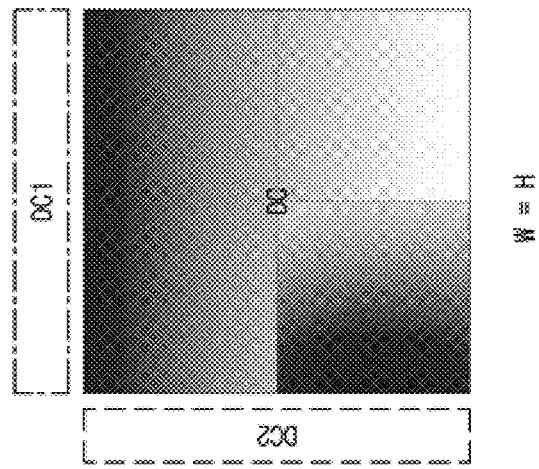
FIGS. 14A-14C are diagrams illustrating examples of prediction in the DC mode according to comparison of horizontal and vertical lengths of the block.
Figure 14B:
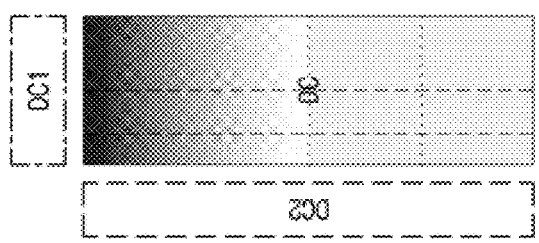
Figure 14A:
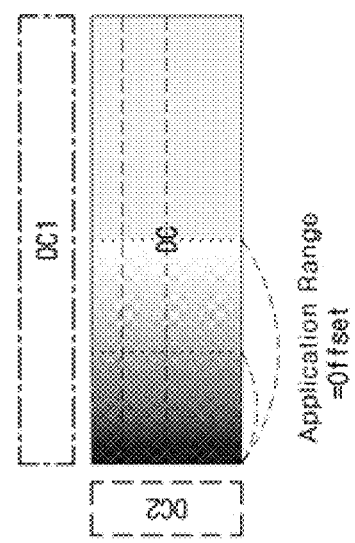

FIGS. 14A-14C show diagrams illustrating examples of prediction in the DC mode according to comparison of horizontal and vertical lengths of the block.

As shown in FIG. 14A, in the case of W>H, the DC value of the current block may be calculated using the statistical value of the W+H reference samples at the left and top of the current block. Also, the statistical value DC2 of the H reference samples at the left of the current block may be calculated, and with respect to an application range region from the left reference sample to the offset of the current block, a prediction value may be calculated using the interpolation value between the DC2 value and the DC value. Here, the offset may be a positive integer that is smaller than W, for example, W/8, W/4, W/2, or the like.

Alternatively, as shown in FIG. 14A, in the case of W>H, the DC value of the current block may be calculated using the statistical value of the W+H reference samples at the left and top of the current block. Also, the statistical value DC1 of the top W reference samples of the current block may be calculated, and with respect to an application range region from the top reference sample to the offset of the current block, a prediction value may be calculated using the interpolation value between the DC1 value and the DC value. Here, the offset may be a positive integer that is smaller than H, for example, H/8, H/4, H/2, or the like.

As shown in FIG. 14B, in the case of W<H, the DC value of the current block may be calculated using the statistical value of the W+H reference samples at the left and top of the current block. Also, the statistical value DC2 of the H reference samples at the left of the current block may be calculated, and with respect to an application range region from the left reference sample to the offset of the current block, a prediction value may be calculated using the interpolation value between the DC2 value and the DC value. Here, the offset may be a positive integer that is smaller than W, for example, W/8, W/4, W/2, or the like.

Alternatively, as shown in FIG. 14B, in the case of W<H, the DC value of the current block may be calculated using the statistical value of the W+H reference samples at the left and top of the current block. Also, the statistical value DC1 of the W reference samples at the top of the current block may be calculated, and with respect to an application range region from the top reference sample to the offset of the current block, a prediction value may be calculated using the interpolation value between the DC1 value and the DC value. Here, the offset may be a positive integer that is smaller than H, for example, H/8, H/4, H/2, or the like.

As shown in FIG. 14C, in the case of W=H, the DC value of the current block may be calculated using the statistical value of the W+H reference samples at the left and top of the current block. Also, the statistical value DC1 of the W reference samples at the top of the current block may be calculated, and the statistical value DC2 of the H reference samples at the left of the current block may be calculated. In the direction of either a larger value or a smaller value of ABS(DC−DC1) and ABS(DC−DC2), with respect to an application range region, a DC prediction value in the application range region may be generated using the interpolation value between the DC value and the DC1 value or the interpolation value between the DC value and the DC2 value.

In the example described with reference to FIGS. 14A-14C, the statistical value may be the average value. The types of interpolation available in the example in FIGS. 14A-14C are described above.

Also, as described above with reference to FIG. 6, when multiple reconstruction sample lines are used, all the reference samples for calculating the DC1 and/or DC2 in FIGS. 14A-14C are part of the same reconstruction sample line. Alternatively, the reference samples for calculating the DC1 and the DC2 may be a part of different reconstruction sample lines. Alternatively, reference samples for calculating the DC1 or DC2 may consist of reference samples with N columns or M rows. Here, N or M may be a positive integer that is equal to or smaller than the number of available reconstruction sample lines.

Figure 15:
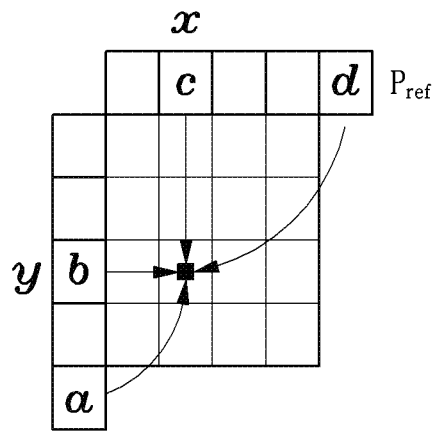
FIG. 15 is a diagram illustrating a planar mode.

FIG. 15 is a diagram illustrating a planar mode.

In the case of the planar mode, prediction may be performed using a weighted sum in which taken into consideration is a distance from one or more reference samples configured depending on the position of the intra prediction target sample of the current block.

In the planar mode, the prediction block may be obtained using a weighted sum of N reference samples dependent on the position (x, y) of the sample. N may be a positive integer that is larger than one. For example, as shown in FIG. 15, in the case of N=4, the prediction value at each position of samples that make up the prediction block may be determined as the statistical value of the top reference sample, the left reference sample, the top right corner sample of the current block, and the bottom left corner sample of the current block. When the statistical value is the weighted sum, calculation is as Equation below.

$$Pred(x, y) = \frac{y+1}{2 \cdot N_s} \cdot p_{ref}(-1, N_s) + \frac{N_s - 1 - x}{2 \cdot N_s} \cdot p_{ref}(-1, y) + \frac{N_s - 1 - y}{2 \cdot N_s} \cdot p_{ref}(x, -1) + \frac{x+1}{2 \cdot N_s} \cdot p_{ref}(N_s, -1)$$
[Equation 5]

Figure 16:
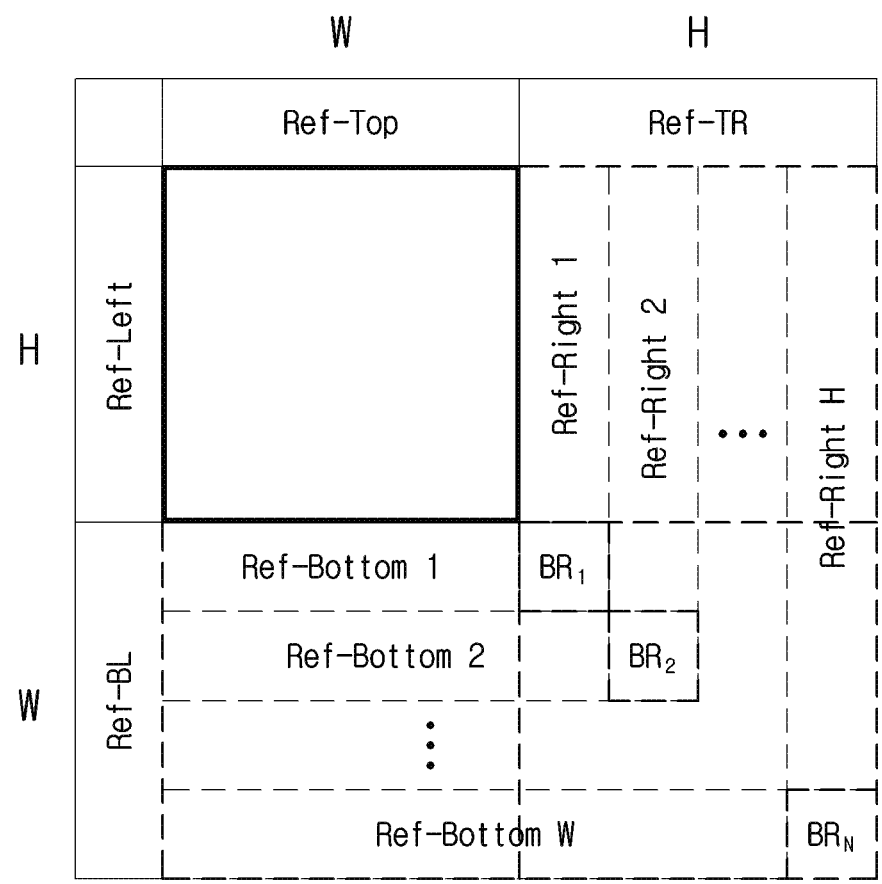
FIG. 16 is a diagram illustrating a planar mode according to an embodiment of the present invention.

FIG. 16 is a diagram illustrating a planar mode according to an embodiment of the present invention.

In the planar mode, the right reference samples Ref-Right1, Ref-Right2, . . . , and Ref-RightH and/or the bottom reference samples Ref-Bottom1, Ref-Bottom2, . . . , and Ref-BottomW for calculating the statistical value may be constructed using the top right reference samples Ref-TR and/or the bottom left reference samples Ref-BL based on the current block.

For example, in FIG. 16, the bottom right reference samples $BR_1$, . . . , and $BR_N$ (wherein, N=max(W, H)) may be obtained using the interpolation values of the reference samples of the Ref-TR and the reference samples of the Ref-BL. Here, the horizontal length W and the vertical length H of the current block may be used as weights. Here, the $BR_N$ may be calculated using one or more reference samples of the Ref-TR with the x-coordinate corresponding to the x-coordinate of the $BR_N$ and/or one or more reference samples of the Ref-BL with the y-coordinate corresponding to the y-coordinate of the $BR_N$. The corresponding coordinate may mean the same coordinate as the coordinate of the $BR_N$, or may mean one or more coordinates derived from the coordinate of the $BR_N$.

For example, in FIG. 16, the right reference samples Ref-Right1, Ref-Right2, . . . , and Ref-RightH may be obtained using the statistical values of the top right reference sample Ref-TR and the bottom right reference samples $BR_1$, . . . , and $BR_N$. Here, the top right reference sample and/or the bottom right reference sample used in calculating the value of one right reference sample may be selected to have corresponding x-coordinates. The meaning of the corresponding coordinates is as described above.

For example, in FIG. 16, the bottom reference samples Ref-Bottom1, Ref-Bottom2, . . . , and Ref-BottomW may be obtained using the statistical values of the bottom left reference sample Ref-BL and the bottom right reference samples $BR_1$, . . . , and $BR_N$. Here, the bottom left reference sample and/or the bottom right reference sample used in calculating the value of one bottom reference sample may be selected to have corresponding y-coordinates. The meaning of the corresponding coordinates is as described above.

For example, when there is one or more available right reference samples Ref-Right1, Ref-Right2, . . . , and Ref-RightH, the statistical value of one or more right reference samples thereof is used in generating a right reference sample for planar prediction.

For example, when there is one or more available bottom reference samples Ref-Bottom1, Ref-Bottom2, . . . , and Ref-BottomW, the statistical value of one or more bottom reference samples thereof is used in generating a bottom reference sample for planar prediction.

The statistical value may be one among the above-described statistical values including the weighted sum as well as a linear interpolation value and a non-linear interpolation value.

Directional intra prediction may be performed on the current block. Directional prediction modes may include one or more modes among a horizontal mode, a vertical mode, and a mode with a predetermined angle.

For example, in the horizontal/vertical mode, at the position of the intra prediction target sample, prediction may be performed using one or more reference samples that are present on a horizontal/vertical line.

For example, when performing prediction in the horizontal/vertical mode, with respect to a target sample at a position spaced apart from the reference sample by predetermined offset or more depending on the shape and/or the size of the current block, prediction is performed using a new reference sample. The predetermined offset may be an arbitrary positive integer, a positive integer that is equal to or smaller than the horizontal length W of the current block, or a positive integer that is equal to or smaller than the vertical length H of the current block depending on the shape and/or size of the block.

Figure 17:
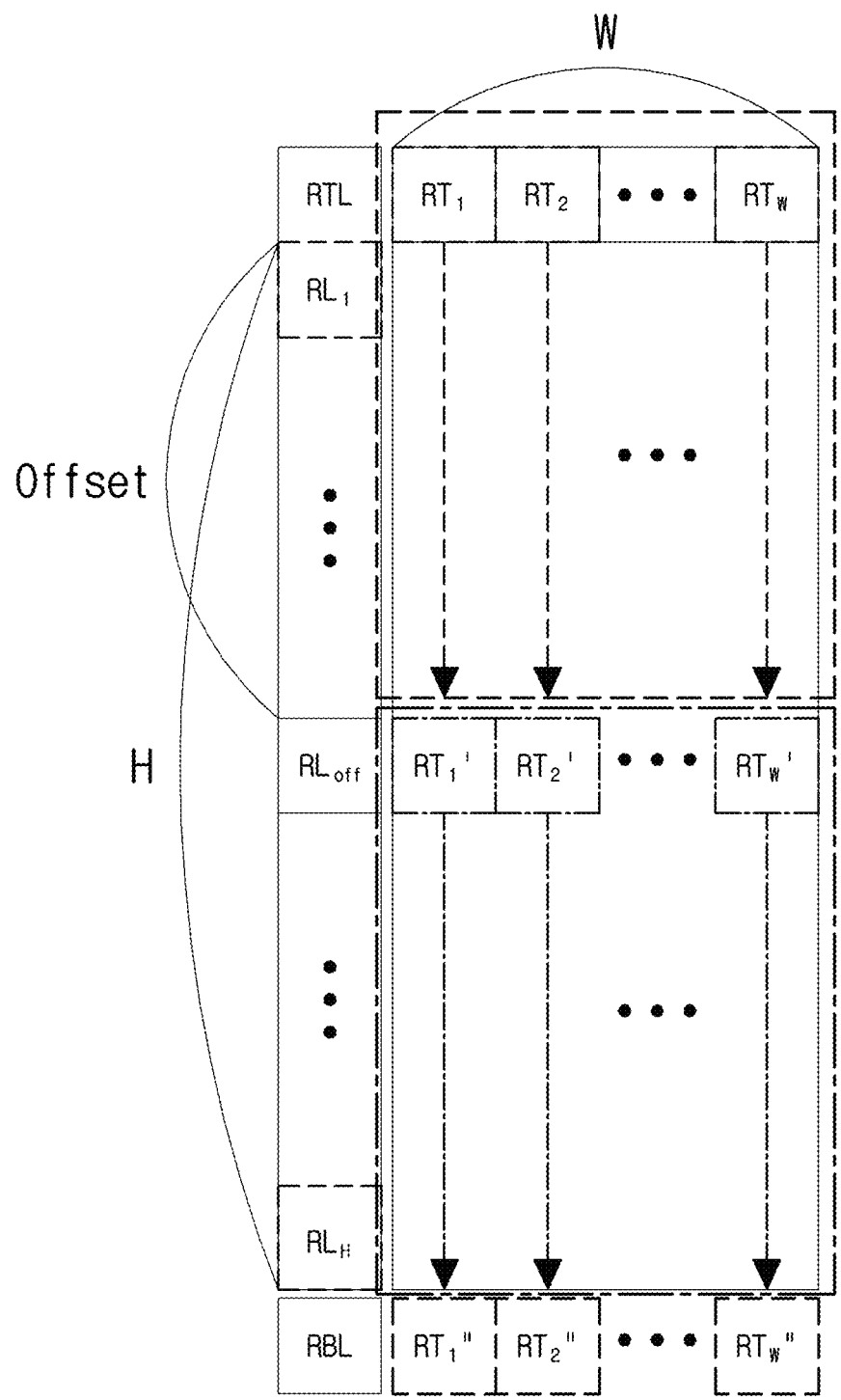
FIG. 17 is a diagram illustrating intra prediction in a vertical mode according to an embodiment of the present invention.

FIG. 17 is a diagram illustrating intra prediction in a vertical mode according to an embodiment of the present invention.

In FIG. 17, the prediction value of the target sample positioned within a predetermined distance (offset) from the top reference sample may be obtained using values of the top reference samples $RR_1$, $RT_2$, . . . , and $RT_W$. The prediction value of the target sample positioned at a predetermined distance or more away from the top reference sample may be obtained using a new first reference value rather than the top reference sample. Here, the new first reference value may be calculated on the basis of the left reference sample, the top left reference sample, and/or the top reference sample. For example, as shown in Equation 6, a new first reference value may be obtained by using the sum of the left reference sample ($RL_{off}$ in FIG. 17) positioned at a predetermined distance (offset) away from the top of the current block and the difference values $delta_1$, $delta_2$, . . . , and $delta_W$. In Equation 6, the difference value ($delta_N$) may mean a difference value between the top left reference sample (RTL in FIG. 17) and each top reference sample ($RT_N$).

$$RT_1' = RL_{off} + delta_1 = RL_{off} + (RT_1 - RTL) \quad \text{[Equation 6]}$$

$$RT_2' = RL_{off} + delta_2 = RL_{off} + (RT_2 - RTL)$$

$$\vdots$$

$$RT_W' = RL_{off} + delta_W = RL_{off} + (RT_W - RTL)$$

As another example of prediction in the vertical mode, as shown in Equation 7, new second reference values $RT_1''$, $RT_2''$, . . . , and $RT_W''$, that are obtained by using the sum of the bottom left reference sample (RBL in FIG. 17) of the current block and the $delta_1$, $delta_2$, . . . , and $delta_W$, may further be used in performing prediction.

$$RT_1'' = RBL + delta_1 = RBL + (RT_1 - RTL) \quad \text{[Equation 7]}$$

$$RT_2'' = RBL + delta_2 = RBL + (RT_2 - RTL)$$

$$\vdots$$

$$RT_W'' = RBL + delta_W = RBL + (RT_W - RTL)$$

For example, the prediction value of the target sample positioned within a predetermined distance (offset) from the top of the current block may be obtained using interpolation values between the top reference samples $RR_1$, $RT_2$, . . . , and $RT_W$ and the new first reference values $RT_1'$, $RT_2'$, . . . , and $RT_W'$. Also, the prediction value of the target sample positioned outside a predetermined distance (offset) away from the top of the current block may be obtained using interpolation values between the new first reference values $RR_1'$, $RT_2'$, . . . , and $RT_W'$ and the new second reference values $RT_1''$, $RT_2''$, . . . , and $RT_W''$.

The examples may be applied to the vertical mode and/or N intra modes adjacent to the vertical mode, and N may be an arbitrary positive integer.

Figure 18:
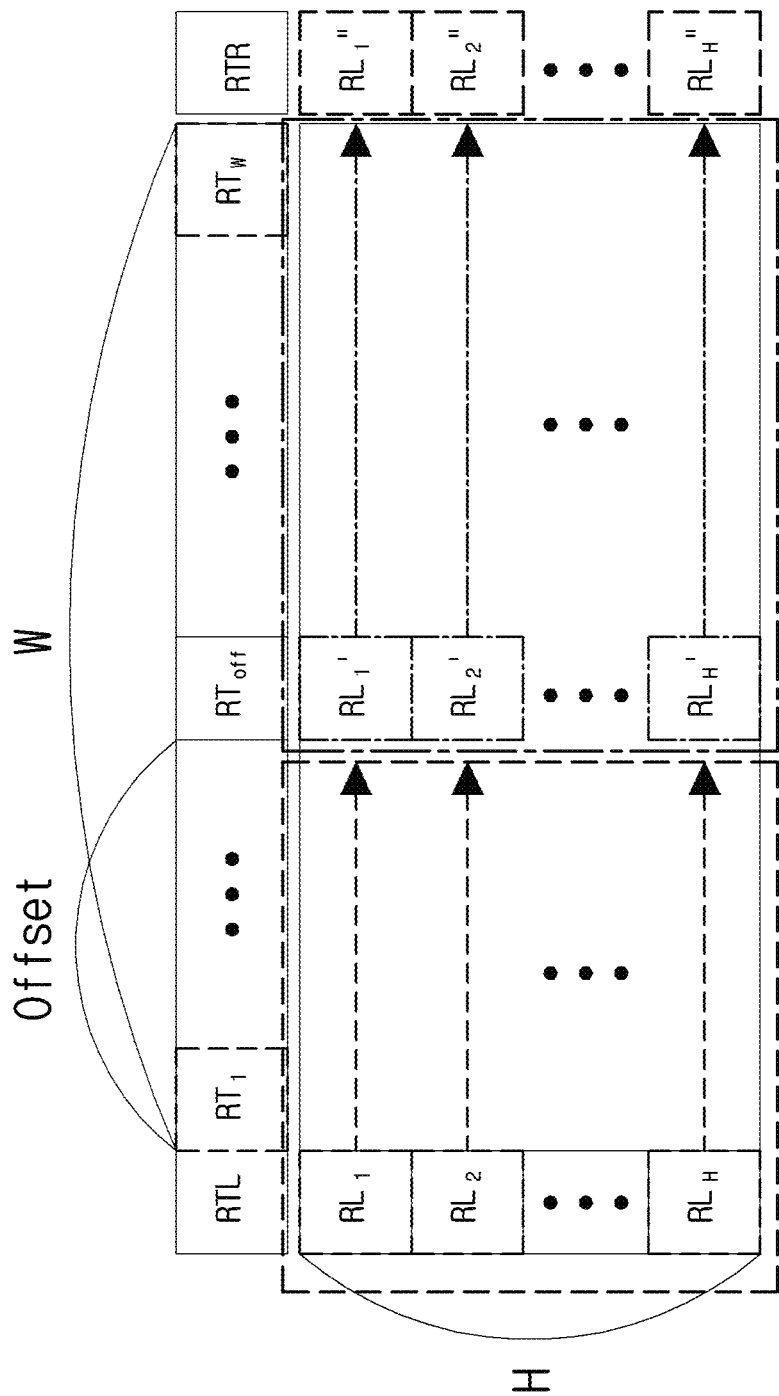
FIG. 18 is a diagram illustrating intra prediction in a horizontal mode according to an embodiment of the present invention.

FIG. 18 is a diagram illustrating intra prediction in a horizontal mode according to an embodiment of the present invention.

In FIG. 18, the prediction value of the target sample positioned within a predetermined distance (offset) from the left reference sample may be obtained using the values of the left reference samples $RL_1$, $RL_2$, . . . , and $RL_H$. The prediction value of the target sample positioned at a predetermined distance or more away from the left reference sample may be obtained using a new first reference value rather than the left reference sample. Here, the new first reference value may be calculated on the basis of the top reference sample, the top left reference sample, and/or the left reference sample. For example, as shown in Equation 8, the new first reference value may be obtained using the sum of the top reference sample ($RT_{off}$ in FIG. 18) positioned at a predetermined distance (offset) away from the left of the current block and the difference values $delta_1$, $delta_2$, . . . , and $delta_H$. In Equation 8, the difference value ($delta_N$) may mean a difference value between the top left reference sample (RTL in FIG. 18) and each left reference sample ($RL_N$).

$$RL'_1 = RT_{off} + \text{delta}_1 = RT_{off} + (RL_1 - RTL) \quad \text{[Equation 8]}$$

$$RL'_2 = RT_{off} + \text{delta}_2 = RT_{off} + (RL_2 - RTL)$$

$$\vdots$$

$$RL'_H = RT_{off} + \text{delta}_H = RT_{off} + (RL_H - RTL)$$

As another example of prediction in the horizontal mode, as shown in Equation 9, new second reference values $RL_1''$, $RL_2''$, ..., and $RL_H''$, that are obtained by using the sum of the top right reference sample (RTR in FIG. 18) of the current block and the $\text{delta}_1$, $\text{delta}_2$, ..., and $\text{delta}_H$, may further be used in performing prediction.

$$RL''_1 = RTR + \text{delta}_1 = RTR + (RL_1 - RTL) \quad \text{[Equation 9]}$$

$$RL''_2 = RTR + \text{delta}_2 = RTR + (RL_2 - RTL)$$

$$\vdots$$

$$RL''_H = RTR + \text{delta}_H = RTR + (RT_H - RTL)$$

For example, the prediction value of the target sample positioned within a predetermined distance (offset) from the left of the current block may be obtained using interpolation values between the left reference samples $RL_1$, $RL_2$, ..., and $RL_H$ and the new first reference values $RL_1'$, $RL_2'$, ..., and $RL_H'$. The prediction value of the target sample positioned outside a predetermined distance (offset) away from the left of the current block may be obtained using interpolation values between the new first reference values $RL_1'$, $RL_2'$, ..., and $RL_H'$ and the new second reference values $RL_1''$, $RL_2''$, ..., and $RL_H''$.

The examples may be applied to the horizontal mode and/or N intra modes adjacent to the horizontal mode, and N may be an arbitrary positive integer.

In the case of a particular mode, filtering (boundary filtering) may be performed on the boundary region of the generated prediction block. Examples of the particular mode may include at least one of non-directional modes, such as a planar mode, a DC mode, and/or directional modes. As a filtering process, there may be one or more reconstruction sample lines at the left and/or the top used in interpolation of the prediction block.

For example, with respect to the prediction block predicted in the DC mode, filtering may be performed on N columns adjacent to the left reconstruction sample line and M rows adjacent to the top reconstruction sample line. Here, N may be a positive integer that is equal to or smaller than the horizontal length W of the current block, and M may be a positive integer that is equal to or smaller than the vertical length H of the current block. Here, filtering may be performed by the above-described interpolation method.

Figure 19:
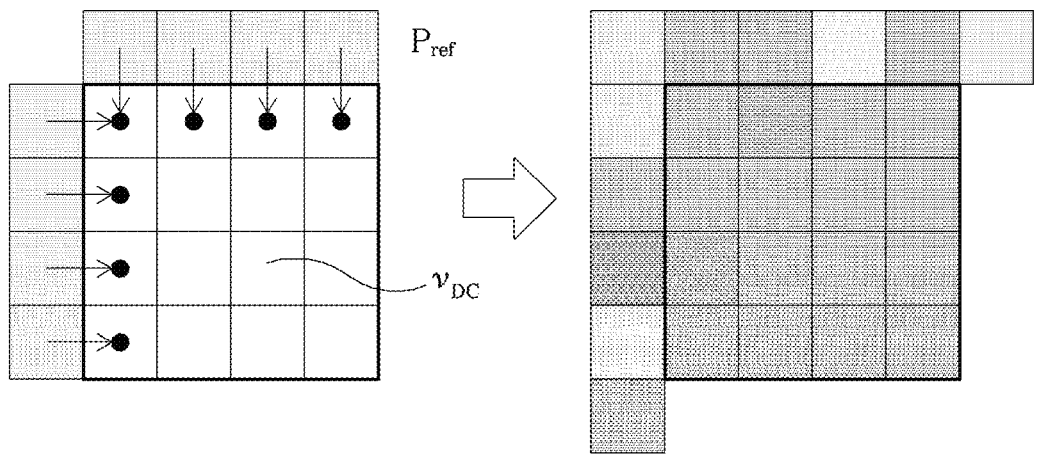
FIG. 19 is a diagram illustrating an example of performing filtering on the prediction block.

FIG. 19 is a diagram illustrating an example of performing filtering on the prediction block.

As shown in FIG. 19, in the case of N=1 and M=1, filtering may be performed using one line of the reconstruction sample lines, at the top and the left adjacent to the current block, at each time. For example, Equation 10 may be used.

$$B_c(0,0) = \tfrac{1}{4}(p_{ref}(-1,0) + p_{ref}(0,-1) + 2v_{DC})$$

$$B_c(x,0) = \tfrac{1}{4}(p_{ref}(x,-1) + 3v_{DC})$$

$$B_c(0,y) = \tfrac{1}{4}(p_{ref}(-1,y) + 3v_{DC}) \quad \text{[Equation 10]}$$

Figure 20A:
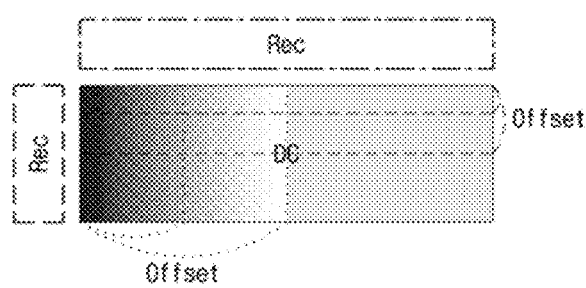
FIGS. 20A-20B are diagrams illustrating examples of performing filtering on the prediction block.
Figure 20B:
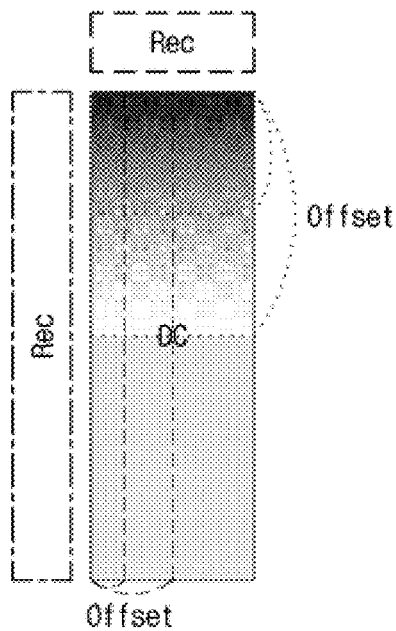

FIGS. 20A-20B show diagrams illustrating examples of performing filtering on the prediction block.

On the prediction block predicted in the DC mode, filtering (boundary filtering) may be performed depending on the shape and/or size of the current block. For example, when the horizontal length of the current block is W and the vertical length is H, as shown in FIG. 20A, filtering is performed on the region positioned within a predetermined distance (offset) from the reconstruction sample at the left and/or the top of the block with W>H. Here, the predetermined distance (offset) may be a positive integer that is equal to or smaller than W or a positive integer that is equal to or smaller than H.

For example, filtering (boundary filtering) may be performed on the M rows of the region positioned within a predetermined distance (offset) from the left reconstruction sample adjacent to the current block. Here, filtering may be performed on a line region at a predetermined distance (offset) from the left reconstruction sample adjacent to each row. The filtering may be performed using the interpolation value between the value of the left reconstruction sample and the DC value. Also, filtering may be performed on the N columns of the region positioned within a predetermined distance from the top reconstruction sample adjacent to the current block. Here, filtering may be performed on a line region at a predetermined distance (offset) from the top reconstruction sample adjacent to each column. The filtering may be performed using the interpolation value between the value of the top reconstruction sample and the DC value.

The process, may be equally performed on the block with W<H as shown in FIG. 20B.

Figure 21:
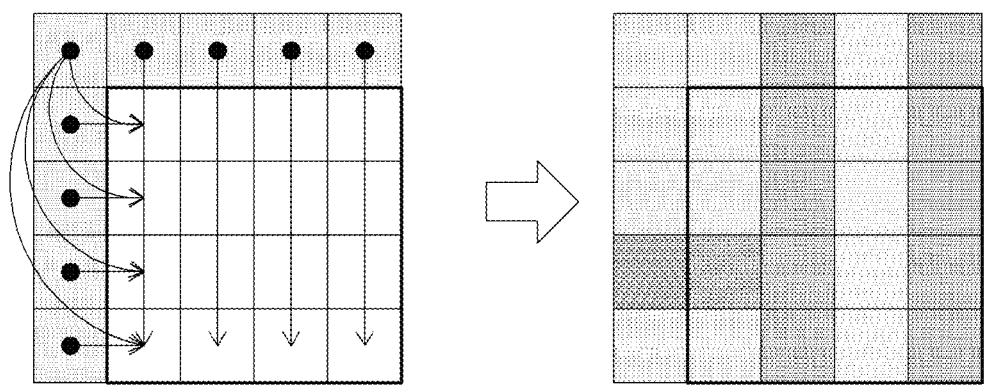
FIG. 21 is a diagram illustrating still another example of performing filtering on the prediction block.
Figure 22A:
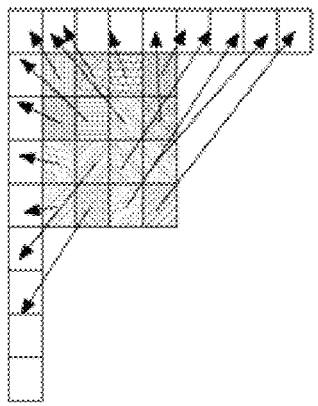
FIGS. 22A-22E are diagrams illustrating various units of intra prediction applicable to the current block.
Figure 22B:
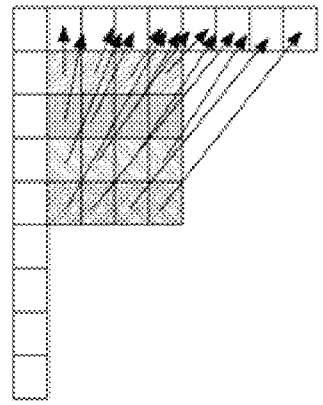
Figure 22C:
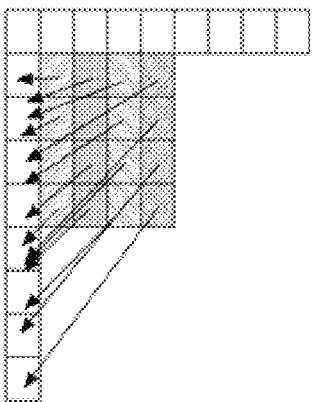
Figure 22D:
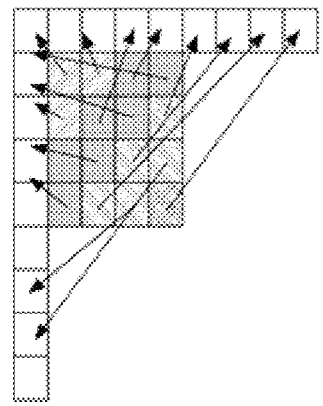
Figure 22E:
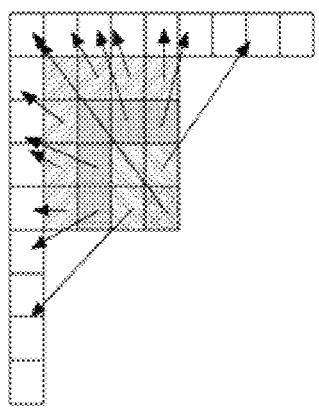

FIG. 21 is a diagram illustrating still another example of performing filtering on the prediction block.

On the prediction block predicted in the vertical mode, filtering (boundary filtering) may be performed as shown in FIG. 21. Here, Equation 11 may be used.

$$B_c(0,y) = p_{ref}(0,-1) + \tfrac{1}{2}(p_{ref}(-1,y) - p_{ref}(-1,-1)) \quad \text{[Equation 11]}$$

The filtering described with reference to FIG. 21 may be similarly performed on the prediction block predicted in the horizontal mode.

Intra prediction in a mode having a predetermined angle may be performed using one or more reference samples on a line at the predetermined angle with respect to the position of a target intra prediction sample. Herein, N reference samples may be used. N may be a positive integer such as 2, 3, 4, 5, or 6. Further, for example, prediction may be performed by applying an N-tap filter such as a 2-tap, 3-tap, 4-tap, 5-tap, or 6-tap filter.

For example, intra prediction may be performed based on position information. The position information may be encoded/decoded, and a reconstruction sample block at the position may be derived as an intra prediction block for the current block. Or a block similar to the current block, detected by the decoder may be derived as an intra prediction block for the current block.

For example, an intra color component prediction may be performed. For example, intra prediction may be performed for a chroma component using a reconstruction luma component of the current block. Or, intra prediction may be performed for another chroma component Cr using one reconstruction chroma component Cb of the current block.

Intra prediction may be performed by using one or more of the afore-described various intra prediction methods in combination. For example, an intra prediction block may be constructed for the current block through a weighted sum of a block predicted using a predetermined non-directional intra prediction mode and a block predicted using a predetermined directional intra prediction mode. Herein, a different weight may be applied according to at least one of the intra prediction mode, block size, shape/and or sample position of the current block.

For example, in combining the one or more intra prediction mode, the prediction block may be constructed using a weighted sum of a predicted value using the intra prediction mode of the current block and a predicted value using the predetermined mode in the MPM list.

Intra prediction may be performed using one or more reference sample sets. For example, intra prediction on the current block may be performed using a weighted sum of, with respect to the constructed reference sample, a block intra predicted with a reference sample not subjected to filtering and a block intra predicted with a reference sample subjected to filtering.

In the process of performing intra prediction, a filtering process using a neighboring reconstructed sample may be performed. Here, whether to perform the filtering process may be determined on the basis of at least one of the intra prediction mode of the current block, and the size and shape of the block. The filtering process may be included in the process of performing intra prediction and may be performed in one step. In performing the filtering process, on the basis of at least one among the intra prediction mode of the current block, the size and the shape of the block, at least one among the filter tap, the coefficient, the number of application lines, and the number of application samples may be determined differently.

In partitioning the current block into sub blocks, deriving an intra prediction mode of each sub block by using an intra prediction mode of the neighboring block, and performing intra prediction, filtering may be performed on each sub block within the current block. For example, a low-pass filter may be applied to the entire current block. Alternatively, the filter may be applied to a sample positioned on the boundary of each sub block.

In partitioning the current block into sub blocks and performing intra prediction on each sub block, each sub block may mean at least one among the encoding/decoding block, the prediction block, and the transform block.

FIGS. 22A-22E show diagrams illustrating various units of intra prediction applicable to the current block.

For example, in performing directional intra prediction, a unit to which the directional mode is applied may be changed. The unit may be one among the block, the sub block, the group of samples within the target block, and the sample of the target block.

In the case of performing one directional prediction on a per-current block basis, when the encoding target block includes a curve with a lot of image characteristics, encoding efficiency is degraded. In order to enhance this, as shown in FIGS. 22A-22E, prediction may be performed using one or more directional modes in units of at least one among the sample, the sample group, and the line (the horizontal line, the vertical line, the diagonal line, the L-shaped line, and the like) in the target block.

When performing directional prediction on a per-sample basis, N (N is a positive integer) directional prediction modes or angles available in units of at least one among the sample, the sample group, and the line are stored as a table, such as a LUT, for use.

When performing directional prediction on a per-sample basis, in scanning a transform coefficient of a residual block for the target block, the scanning methods may vary depending on at least one among the type of directional prediction on a per-sample basis, and the size/shape of the block. For example, depending on the type of directional prediction on a per-sample basis, one or more of up-right scanning, vertical direction scanning, horizontal direction scanning, zigzag scanning may be used to apply scanning.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. An image decoding method performed by an image decoding apparatus, the method comprising:
deriving an intra prediction mode of a current block;
selecting a reference sample line among a plurality of reference sample lines of the current block;
deriving reference samples of the current block based on the reference sample line; and
generating a prediction block of the current block by performing intra prediction for the current block based on the intra prediction mode and the reference sample,
wherein, in response to a first reference sample line being selected as the reference sample line among the plurality of reference sample lines, the reference samples are derived by filtering the reference sample line, the first reference sample line being immediately adjacent to the current block,
wherein, in response to the first reference sample line not being selected as the reference sample line among the plurality of reference sample lines, the reference samples are derived without filtering the reference sample line,
wherein the reference sample line is selected based on whether a top boundary of the current block corresponds to a boundary of a current coding tree block, the current block being obtained by dividing the current coding tree block,
wherein, in response to the top boundary of the current block not corresponding to the boundary of the current coding tree block, the reference sample line is selected based on an indicator signaled from a bitstream, the indicator indicating one of the plurality of reference sample lines, and
wherein, in response to the top boundary of the current block corresponding to the boundary of the current coding tree block, the first reference sample line is selected as the reference sample line without signaling the indicator from the bitstream.

2. The method of claim 1,
wherein the intra prediction mode of the current block is derived using an MPM list determined based on intra prediction modes of neighboring blocks of the current block, and
wherein the neighboring blocks are a left block and a top block of the current block.

3. The method of claim 2,
wherein the MPM list comprises MPM candidates derived using statistic values of the intra prediction modes of the neighboring blocks, and
wherein the statistic values are a maximum value and a minimum value.

4. The method of claim 1,
wherein the intra prediction mode of the current block is derived using an MPM list determined based on a flag signaled from the bitstream among a plurality of MPM lists.

5. The method of claim 4,
wherein, in response to the determined MPM list including only one MPM candidate, the intra prediction mode of the current block is derived as the one MPM candidate, and
wherein, in response to the determined MPM list including a plurality of MPM candidates, the intra prediction mode of the current block is derived as an MPM candidate selected based on an index indicating one among the plurality of MPM candidates.

6. The method of claim 1,
wherein, in response to the current block being non-square and the intra prediction mode being a DC mode, the intra prediction for the current block is performed by a weighted sum of reference samples adjacent to a longer side among a width and height of the current block.

7. The method of claim 6,
wherein the weighted sum is calculated using a right-shift operation based on a length of the longer side among the width and height of the current block.

8. An image encoding method performed by an image encoding apparatus, the method comprising:
- determining an intra prediction mode of a current block;
- selecting a reference sample line among a plurality of reference sample lines of the current block;
- deriving reference samples of the current block based on the reference sample line; and
- generating a prediction block of the current block by performing intra prediction for the current block based on the intra prediction mode and the reference sample,
- wherein, in response to a first reference sample line being selected as the reference sample line among the plurality of reference sample lines, the reference samples are derived by filtering the reference sample line, the first reference sample line being immediately adjacent to the current block,
- wherein, in response to the first reference sample line not being selected as the reference sample line among the plurality of reference sample lines, the reference samples are derived without filtering the reference sample line,
- wherein the reference sample line is selected based on whether a top boundary of the current block corresponds to a boundary of a current coding tree block, the current block being obtained by dividing the current coding tree block,
- wherein, in response to the top boundary of the current block not corresponding to the boundary of the current coding tree block, the reference sample line is selected as one of the plurality of reference sample lines, and an indicator indicating the one of the plurality of reference sample lines is encoded into a bitstream, and
- wherein, in response to the top boundary of the current block corresponding to the boundary of the current coding tree block, the first reference sample line is selected as the reference sample line, and the indicator is not encoded into the bitstream.

9. The method of claim 8,
wherein the intra prediction mode of the current block is encoded using an MPM list determined based on intra prediction modes of neighboring blocks of the current block, and
wherein the neighboring blocks are a left block and a top block of the current block.

10. The method of claim 9,
wherein the MPM list comprises MPM candidates derived using statistic values of the intra prediction modes of the neighboring blocks, and
wherein the statistic values are a maximum value and a minimum value.

11. The method of claim 8,
wherein a flag related to which an MPM list, among a plurality of MPM lists, the intra prediction mode of the current block is included in, is encoded into the bitstream.

12. The method of claim 11,
wherein, in response to the MPM list including a plurality of MPM candidates, an index indicating one MPM candidate representing the same prediction mode as the intra prediction mode of the current block among the plurality of MPM candidates is encoded into the bitstream, and
wherein, in response to the MPM list including only one MPM candidate, the index is not encoded into the bitstream.

13. The method of claim 8,
wherein, in response to the current block being non-square and the intra prediction mode being a DC mode, the intra prediction for the current block is performed by a weighted sum of reference samples adjacent to a longer side among a width and height of the current block, in response to the current block being non-square and the intra prediction mode being a DC mode.

14. The method of claim 13,
wherein the weighted sum is calculated using a right-shift operation based on a length of the longer side among the width and height of the current block.

15. A method for storing a bitstream associated with video data, the method comprising:
- generating the bitstream containing encoded data for a current block; and
- storing the bitstream in a non-transitory computer-readable medium,
- wherein the generating of the bitstream comprises:
- determining an intra prediction mode of the current block;
- selecting a reference sample line among a plurality of reference sample lines of the current block;
- deriving reference samples of the current block based on the filtered reference sample line; and generating a prediction block of the current block by performing intra prediction for the current block based on the intra prediction mode and the reference sample,
- wherein, in response to a first reference sample line being selected as the reference sample line among the plurality of reference sample lines, the reference samples are derived by filtering the reference sample line, the first reference sample line being immediately adjacent to the current block,
- wherein, in response to the first reference sample line not being selected as the reference sample line among the plurality of reference sample lines, the reference samples are derived without filtering the reference sample line,
- wherein the reference sample line is selected based on whether a top boundary of the current block corresponds to a boundary of a current coding tree block, the current block being obtained by dividing the current coding tree block,
- wherein, in response to the top boundary of the current block not corresponding to the boundary of the current coding tree block, the reference sample line is selected as one of the plurality of reference sample lines, and an indicator indicating the one of the plurality of reference sample lines is encoded into a bitstream, and
- wherein, in response to the top boundary of the current block corresponding to the boundary of the current coding tree block, the first reference sample line is selected as the reference sample line, and the indicator is not encoded into the bitstream.

* * * * *